(12) United States Patent
Klassen et al.

(10) Patent No.: US 12,020,119 B2
(45) Date of Patent: Jun. 25, 2024

(54) LOW-WEIGHT FERMION-TO-QUBIT ENCODING

(71) Applicant: Phasecraft Limited, London (GB)

(72) Inventors: Joel David Klassen, London (GB); Charles Nicholas Carey Derby, London (GB)

(73) Assignee: Phasecraft Limited, London (GB)

( * ) Notice: Subject to any disclaimer, the term of this patent is extended or adjusted under 35 U.S.C. 154(b) by 0 days.

(21) Appl. No.: 17/798,290

(22) PCT Filed: Feb. 3, 2021

(86) PCT No.: PCT/GB2021/050229
§ 371 (c)(1),
(2) Date: Aug. 8, 2022

(87) PCT Pub. No.: WO2021/160989
PCT Pub. Date: Aug. 19, 2021

(65) Prior Publication Data
US 2023/0081773 A1    Mar. 16, 2023

(30) Foreign Application Priority Data

Feb. 13, 2020  (GB) .................................... 2002000

(51) Int. Cl.
G06N 10/00    (2022.01)
G06F 9/54     (2006.01)
G06N 10/40    (2022.01)

(52) U.S. Cl.
CPC ............. *G06N 10/40* (2022.01); *G06F 9/542* (2013.01)

(58) Field of Classification Search
CPC ......... G06N 10/40; G06N 10/00; G06F 9/542
See application file for complete search history.

(56) References Cited

U.S. PATENT DOCUMENTS

2011/0238607 A1* 9/2011 Coury .................... G06T 11/206
                                                        706/46
2014/0207723 A1* 7/2014 Alboszta ................ B82Y 10/00
                                                        706/46

(Continued)

OTHER PUBLICATIONS

Barends, et al., "Digital Quantum Simulation of Fermionic Models with a Superconducting Circuit", Nature Communications, vol. 6, No. 7654, Jul. 8, 2015, 7 pages.

(Continued)

*Primary Examiner* — Tuan C Dao
(74) *Attorney, Agent, or Firm* — Kilpatrick Townsend & Stockton LLP

(57) ABSTRACT

A computer-implemented method of determining a control sequence for performing a quantum operation on a quantum information processor comprising a plurality of qubits is described herein. The quantum operation is characterised by a fermionic quantum operator for acting on local fermionic modes. The method comprises translating, using a fermion-to-qubit encoding, the fermionic quantum operator to a qubit operator for operating on the plurality of qubits, and determining from the qubit operator a control sequence for performing the quantum operation on the quantum information processor. Apparatuses and computer-readable media are also described.

20 Claims, 23 Drawing Sheets

(56) References Cited

U.S. PATENT DOCUMENTS

| | | | |
|---|---|---|---|
| 2014/0250288 A1* | 9/2014 | Roy .................... | G06N 5/01 |
| | | | 712/223 |
| 2017/0255629 A1* | 9/2017 | Thom .................. | G06N 10/00 |
| 2019/0332731 A1* | 10/2019 | Chen ................... | G06N 10/00 |
| 2020/0380084 A1* | 12/2020 | Gambetta ............. | G06N 10/00 |
| 2020/0401927 A1* | 12/2020 | Nickerson ............ | G06F 13/40 |
| 2021/0034625 A1* | 2/2021 | Shah .................. | G06F 16/9024 |
| 2021/0034998 A1* | 2/2021 | Cao .................... | G06N 10/00 |
| 2021/0279631 A1* | 9/2021 | Pichler ................ | G06N 10/20 |

OTHER PUBLICATIONS

GB2002000.4, "Combined Search and Examination Report", dated Jul. 28, 2020, 6 pages.

GB2002000.4, "First Examination Report", dated Dec. 15, 2020, 13 pages.

PCT/GB2021/050229, "International Search Report and Written Opinion", dated May 10, 2021, 19 pages.

Steudtner, et al., "Quantum Codes for Quantum Simulation of Fermions on a Square Lattice of Qubits", Available Online at: https://arxiv.org/pdf/1810.02681.pdf, Aug. 2, 2019, 44 pages.

* cited by examiner

Translate, using fermion-to-qubit encoding, fermionic quantum operator to a qubit operator — 510

Determine, from the qubit operator, a control sequence for performing quantum operation on quantum information processor — 520

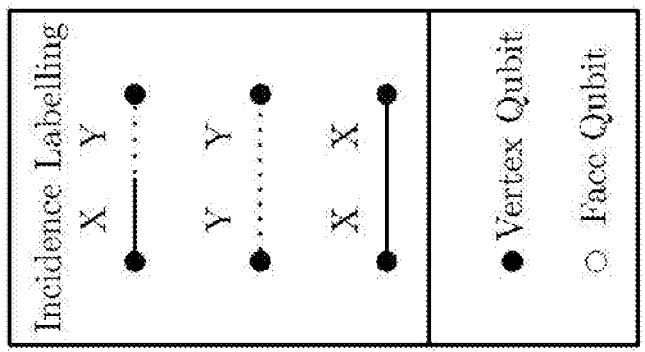
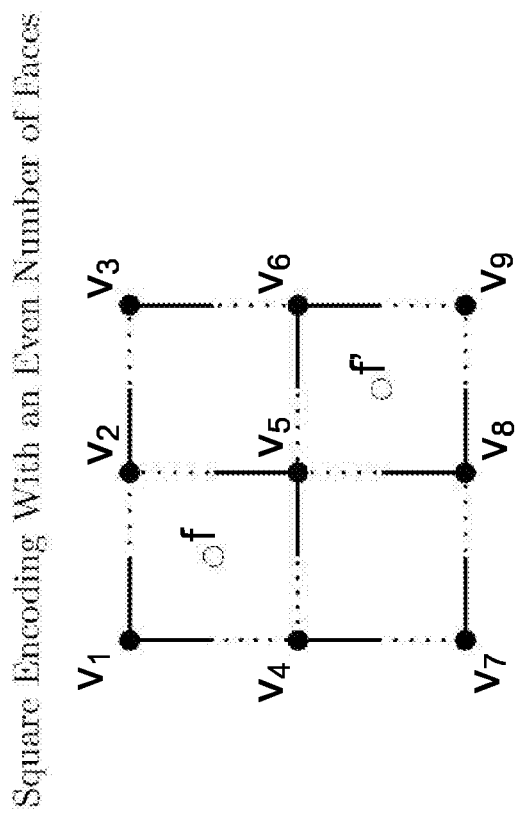
FIG. 6A

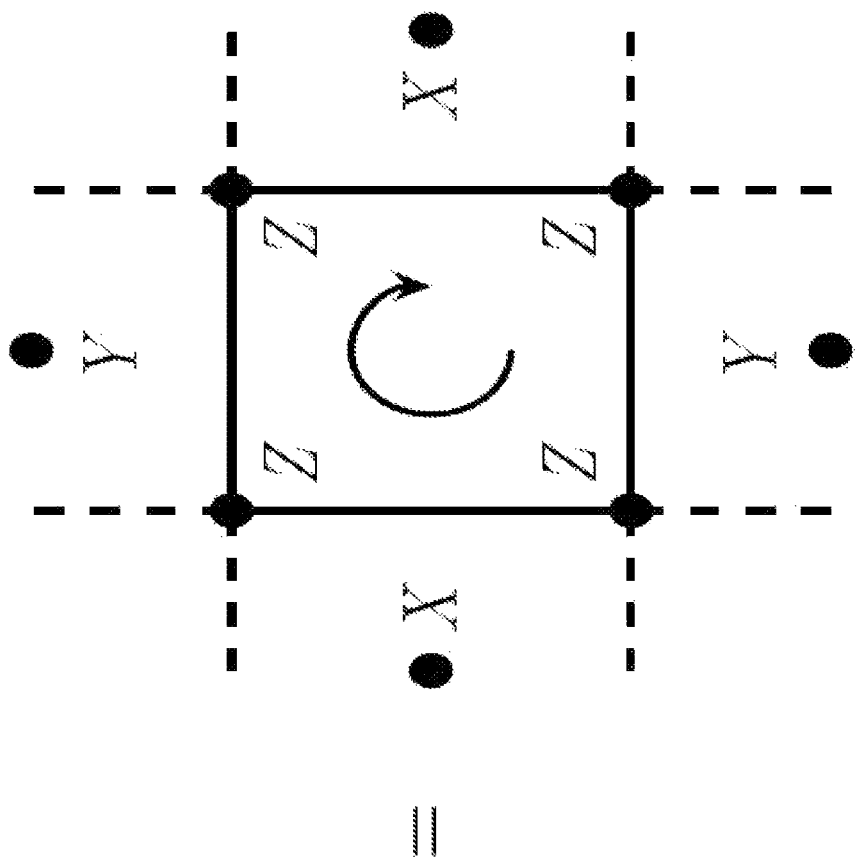
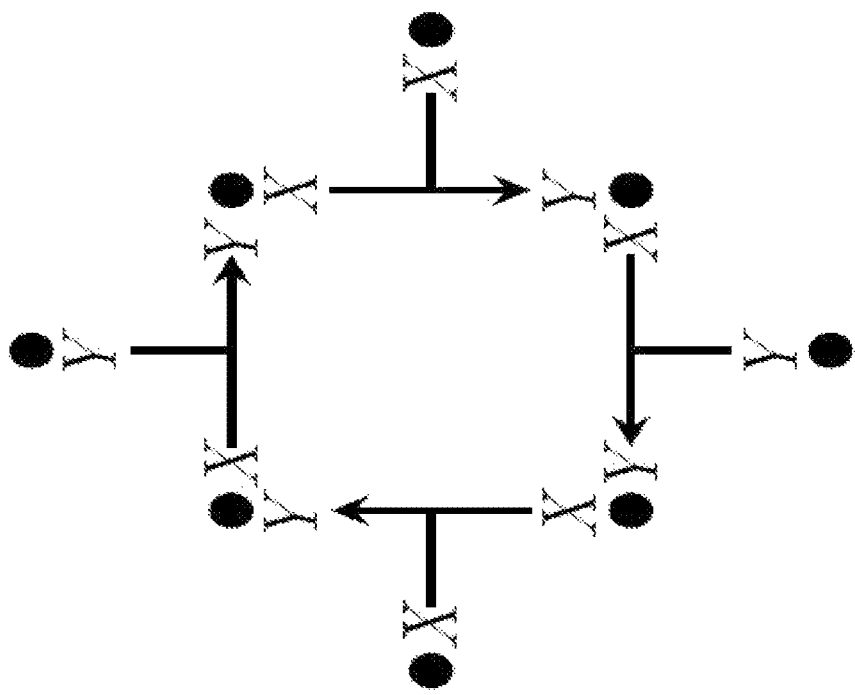

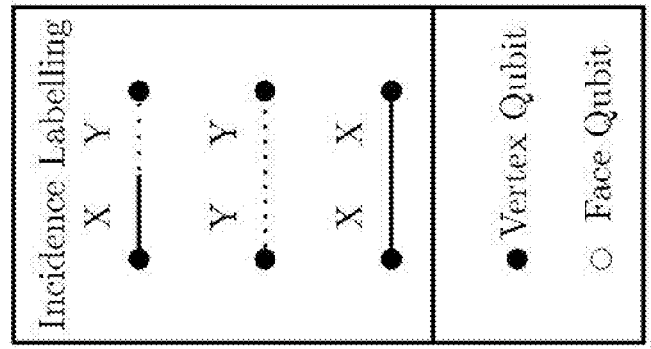
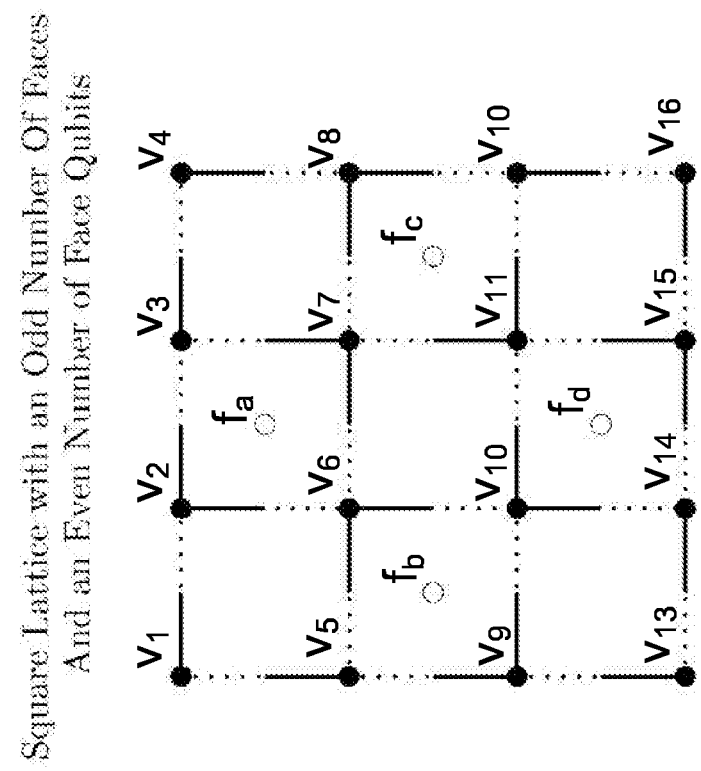
FIG. 9A

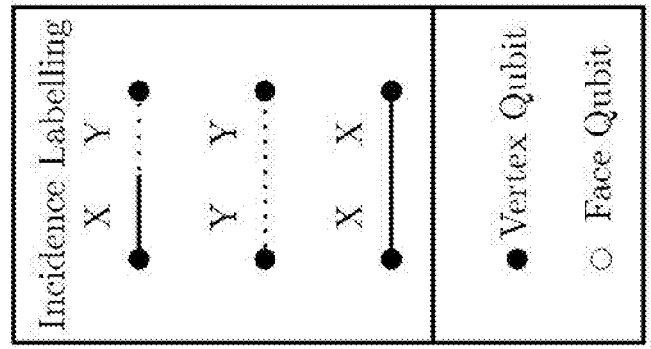
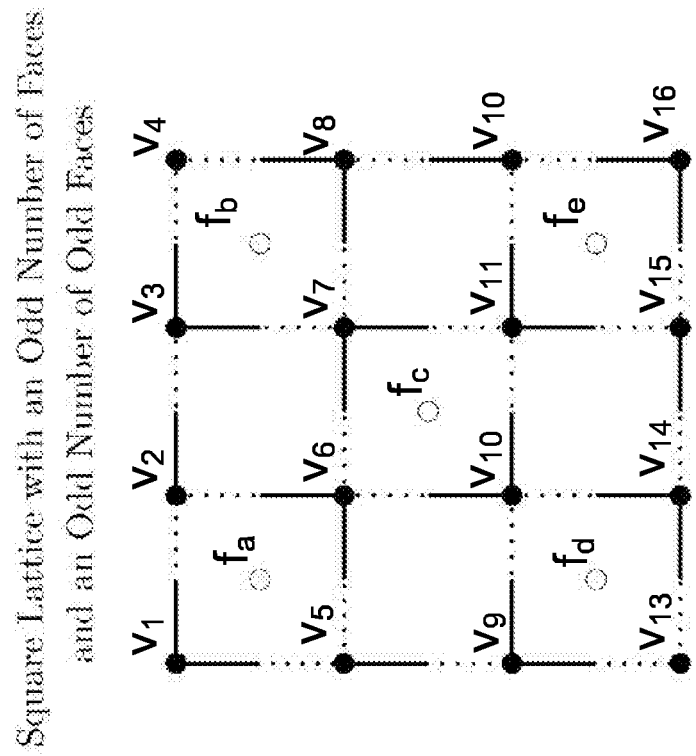
FIG. 9B

FIG. 13

| Lattice Type | $L \times L$ Square w/ even face number | $L \times L$ Square w/ majority even faces | $L \times L$ square w/ majority odd faces | hexagonal face centered $L \times L$ square shape |
|---|---|---|---|---|
| Fermionic modes | $2L^2$ | $3L^2$ | $2L^2$ | $2(2L^2 + 4L)$ |
| Qubit Number | $3L^2 - L$ | $3L^2 - L - 1$ | $3L^2 - L + 1$ | $2(3L^2 + 4L)$ |
| Qubit to Mode Ratio | $1.5 - \frac{2}{L}$ | $1.5 - \frac{2}{L} - \frac{1}{2L^2}$ | $1.5 - \frac{2}{L} + \frac{1}{2L^2}$ | $1.5 - \frac{1}{L+2}$ |
| Max Weight Hopping | 3 | 3 | 3 | 3 |
| Max Weight Coulomb | 2 | 2 | 2 | 2 |
| Encoded Fermionic Space | Full | Even | Full Plus Qubit | Full |
| Corrects Single Qubit Errors? | No | No | No | No |

FIG. 14

| Reference | [BK02] | [VC05, WHT16] | [JMBN18] | [SW19] | [SBMW19] |
|---|---|---|---|---|---|
| Qubit Number | $4L(L-1)$ | $4L^2$ | $4L(L-1)$ | $4L^2 - 2L$ | $6L^2$ |
| Qubit to Mode Ratio | $2 - \frac{2}{L}$ | $2$ | $2 - \frac{2}{L}$ | $2 - \frac{1}{L}$ | $3$ |
| Max Weight Hopping | $6$ | $4$ | $4$ | $5$ | $4$ |
| Max Weight Coulomb | $8$ | $2$ | $6$ | $6$ | $6$ |
| Encoded Fermionic Space | Even | Full | Even | Full | Even |
| Graph Types | General | General | Square Lattice | Square Lattice | General |
| Corrects Single Qubit Errors? | No | No | Yes | No | Yes |

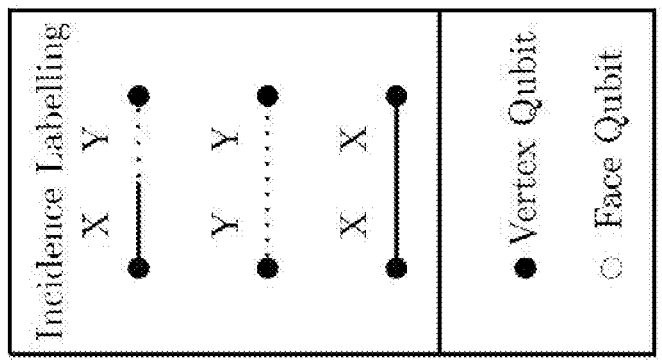
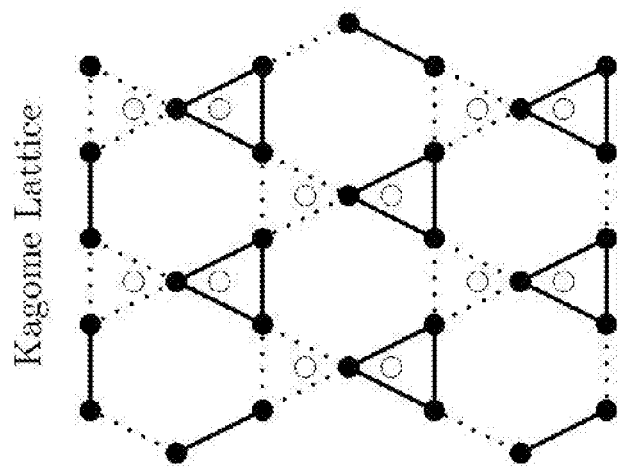
FIG. 15A

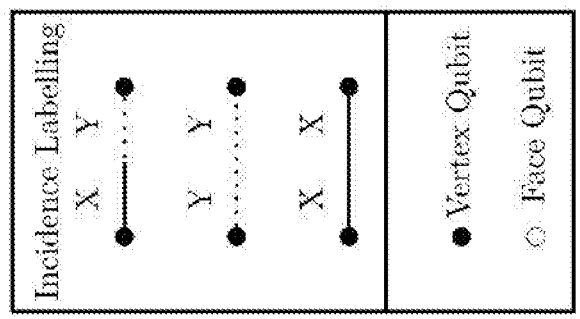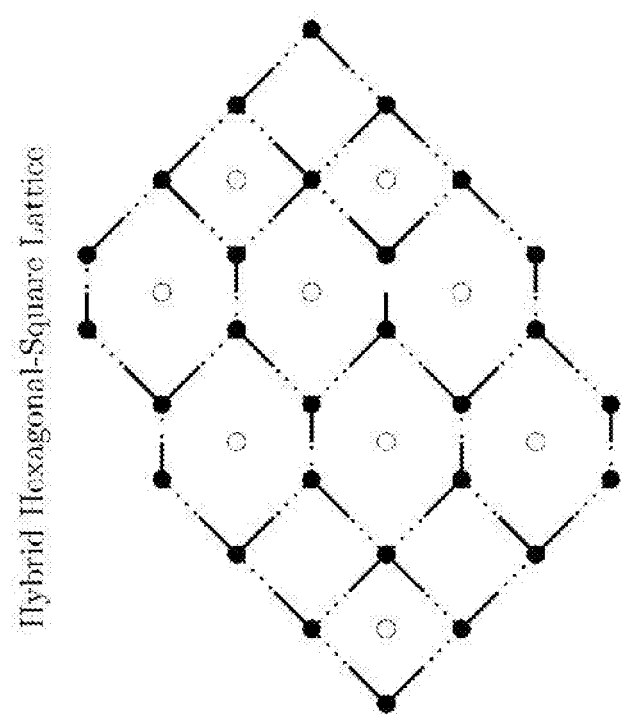
FIG. 16

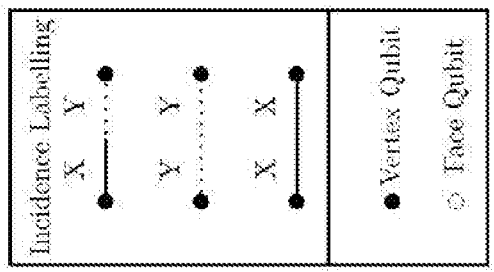
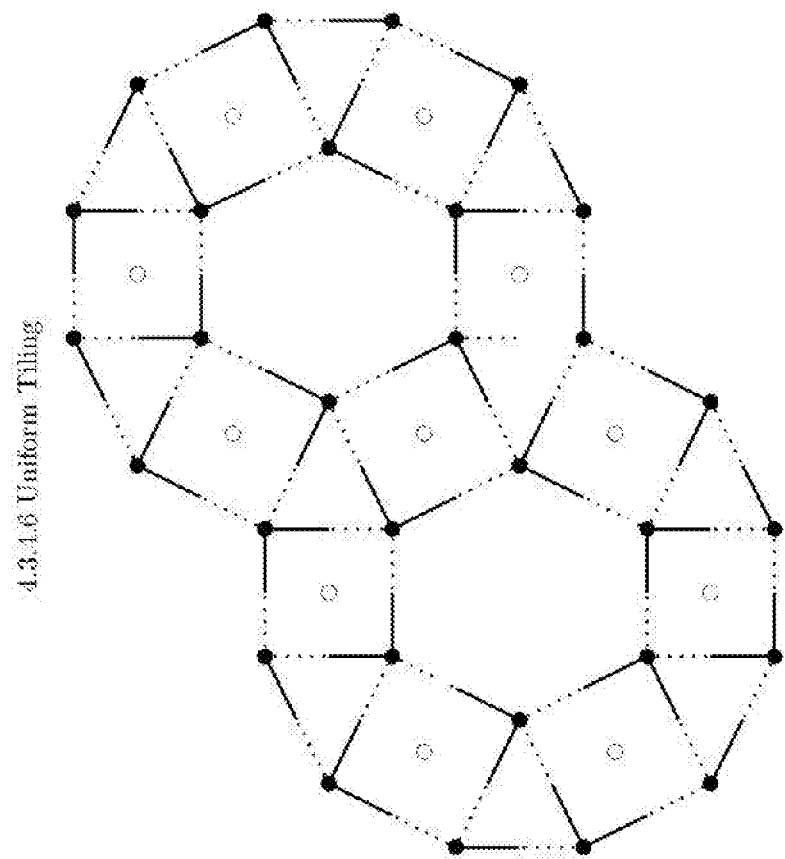
FIG. 17

LOW-WEIGHT FERMION-TO-QUBIT ENCODING

TECHNICAL FIELD

The present disclosure relates to quantum computing, and in particular, to methods for determining control sequences to perform quantum algorithms using quantum information processors/quantum computers, and the application of those control sequences. More specifically, the present disclosure relates to the encoding of fermionic systems into qubit systems.

BACKGROUND

A quantum computer is a device that processes quantum information, which is a generalisation of the classical information (such as discrete classical bits i.e. 0's and 1's) that classical computers process. A quantum computer has the potential to be far more powerful than a classical computer for at least some processes because many operations can be performed much more efficiently.

In a computer for the processing of quantum bits, otherwise known as "qubits", each qubit can be placed in one of two orthogonal states. However, due to the nature of quantum bits, they can also be placed in a superposition of these two orthogonal states. If every logical qubit of a computer is placed in a suitable superposition of states, the overall superposition of states in the computer scales as T where n is the number of logical qubits. Amongst other effects such as quantum entanglement, quantum algorithms can exploit these superpositions of states to solve various problems.

In principle any two-level quantum system can be used to define a qubit. The eigenstates of an operator Z can be, for example, a ground state $|g\rangle$ and an excited state $|e\rangle$. The ground state may be a first eigenstate of the Z operator with $Z|g\rangle=+1|g\rangle$, and the excited state may be a second eigenstate of the Z operator with $Z|e\rangle=-1|e\rangle$. However, the qubit may exist in a superposition of its eigenstates, $|\psi\rangle=\alpha|g\rangle+\beta|e\rangle$, for some real values $\alpha$ and $\beta$ such that $|\alpha|^2+|\beta|^2=1$. A measurement of the qubit in the Z basis will project the qubit onto either the ground state or the excited state with a probability dependent on the parameters $\alpha$ and $\beta$. A state projection may be intentionally caused by a measurement, or may be unintentionally caused as a result of a qubit's interaction with the environment. A major obstacle to the development of quantum computers is decoherence—unintended interactions of a quantum state with the external world leads to a loss of quantum information.

Advances in quantum computing have now developed to the point at which "quantum supremacy" has been achieved, ushering in the era of noisy, intermediate-scale quantum (NISQ) hardware, which can no longer be simulated effectively classically, even on the world's largest supercomputers. However, this "supremacy-class" hardware is still extremely limited in terms of the number of qubits that can be controlled and the decoherence time—the time after which the fidelity of the qubits has degraded to the extent that the results of a performed algorithm are effectively meaningless. Currently quantum computing architectures have on the order of ≈50 qubits, and are only capable of implementing quantum circuits up to depth of order ≈50 before decoherence renders the results meaningless. Critical factors that determine the feasibility of performing a quantum algorithm include its qubit requirements (e.g. the number of qubits required and the ability to control interactions between them), its gate cost and its circuit depth (a measure of algorithm runtime).

Simulating quantum systems on a quantum computer is one of the most promising applications of quantum computers. It is hoped that quantum computers will help increase understanding of large molecules and strongly-correlated materials. Many physical and chemical systems are based on fermionic models. A fermion is a particle which has half-integer spin and is therefore constrained by the Pauli Exclusion Principle. Fermions include all quarks and leptons, as well as any composite particle made of an odd number of these, such as all baryons and many atoms or nuclei. Examples of fermions include electrons, neutrons and protons. The wavefunction which describes a collection of fermions must be antisymmetric with respect to the exchange of identical particles, while the wavefunction for a collection of bosons (integer-spin particles) is symmetric under the exchange of identical particles. Fermions additionally possess conserved baryon or lepton quantum numbers. As a consequence of the Pauli Exclusion Principle, only one fermion can occupy a particular quantum state at any given time. If multiple fermions have the same spatial probability distribution then at least one property of each fermion, such as its spin, must be different.

The mapping (encoding) of fermionic degrees of freedom onto qubit degrees of freedom and fermionic quantum operators onto qubit operators is a non-trivial exercise. One well-known fermion-to-qubit encoding is the Jordan-Wigner transformation, sometimes referred to herein as "JW" (see Pascual Jordan and Eugene Paul Wigner. über das paulische äquivalenzverbot. In *The Collected Works of Eugene Paul Wigner*, pages 109-129. Springer, 1993). However, with the Jordan-Wigner transformation, some local interactions between fermionic modes are mapped to operations involving many qubits, which may put such operations beyond the feasibility of performance on NISQ harware. Other encodings are known. S. Brayvi et al. Fermionic quantum computation, Annals of Physics, 298(1):210-226, 2002, hereafter referred to as "BK02", provides a first example. F. Verstraete et al. Mapping local hamiltonians of fermions to local hamiltonians of spin, Journal of Statistical Mechanics: Theory and Experiment, 2005(09):P09012, 2005, hereafter referred to as "VC05", provides a second example. J. Whitfield et al. Local spin operators for fermion simulations, Phys. Rev. A, 93(3):030301, 2016, hereafter referred to as "WHT16", provides a third example. Z. Jiang et al. Majorana loop stabilizer codes for error correction of fermionic quantum simulations, 2018, hereafter referred to as "JMBN18", provides a fourth example. M. Steudtner et al. Quantum codes for quantum simulation of fermions on a square lattice of qubits, Phys. Rev. A, 99(2):022308, 2019, hereafter referred to as "SW19", provides a fifth example. K. Setia et al. Superfast encodings for fermionic quantum simulation, Physical Review Research 1(3):033033, 2019, hereafter referred to as "SBMW19" provides a sixth example.

Nevertheless, known fermion-to-qubit encodings suffer from drawbacks when being applied to near term quantum computers. In some cases, the encodings require large numbers of qubits. In some cases, fermionic operators acting on a small number of fermions require many qubit operations on qubits, which impacts accuracy and run-time.

The present disclosure seeks to mitigate some of the problems with implementing quantum algorithms based on fermionic quantum operators.

SUMMARY

A computer-implemented method is provided. The computer-implemented method is for determining a control sequence for performing a quantum operation on a quantum information processor. The quantum information processor comprises a plurality of vertex qubits and a plurality of face qubits. The quantum operation is characterised by a fermionic quantum operator for acting on local fermionic modes. The method comprises translating, using a fermion-to-qubit encoding, the fermionic quantum operator to a qubit operator for operating on the plurality of vertex qubits and face qubits. The method further comprises determining from the qubit operator a control sequence for performing the quantum operation on the quantum information processor.

The fermion-to-qubit encoding is characterised by an encoding graph comprising a plurality of vertices and edges. Each edge, $e_{vj,vk}$, of the encoding graph is incident on two vertices, $(v_j, v_k)$. Each incidence, $(e_{vj,vk}, v_j)$, in the encoding graph is labelled with either a first label or a second label. Each local fermionic mode on which the fermionic quantum operator acts is associated with a corresponding vertex of the encoding graph. Each vertex qubit of the plurality of vertex qubits is associated with a corresponding vertex of the encoding graph.

An incidence frustration comprises a first incidence, $(e_{vp,vq}, v_p)$, and a second incidence, $(e_{vr,vp}, v_p)$, on a common vertex, $v_p$, for which the label of the first incidence is the same as the label of the second incidence. Each incidence frustration is associated with a face qubit of the plurality of face qubits. Each face qubit may be associated with multiple incidence frustrations.

The qubit operator is associated with a combination of at least one vertex operator and/or at least one edge operator. For a vertex, $v_s$, of the encoding graph, a corresponding vertex operator, $v_s$, consists of a single-qubit Pauli operator acting on the vertex qubit, s, associated with that vertex.

An edge operator, $E_{mn}$, is associated with an ordered pair of adjacent vertices, $(v_m, v_n)$, and a corresponding pair of incidences, $(e_{vm,vn}, v_m)$, $(e_{vm,vn}, v_n)$. An edge operator comprises, for each vertex $v_m$ of the ordered pair of adjacent vertices, a first-type single-qubit Pauli operator, $\sigma_m^1$, acting on the vertex qubit, m, associated with the vertex $v_m$ if the corresponding incidence $(e_{vm,vn}, v_m)$ is labelled with the first label, the first-type single-qubit Pauli operator different from the vertex operator, $V_m$, for that vertex. An edge operator, $E_{mn}$, further comprises, for each vertex $v_m$ of the ordered pair of adjacent vertices, a second-type single-qubit Pauli operator, $\sigma_m^2$, acting on the vertex qubit, m, associated with the vertex $v_m$ if the corresponding incidence $(e_{vm,vn}, v_m)$ is labelled with the second label, the second-type single-qubit Pauli operator different from the first-type single-qubit Pauli operator and the vertex operator, $V_m$, for that vertex, $v_m$. An edge operator, $E_{mn}$, may further comprise a coefficient of +1 or −1. An edge operator, $E_{mn}$, further comprises a single-qubit Pauli operator, $\sigma(e_{vm,vn}, f)$, acting on every face qubit f associated with an incidence frustration if that incidence frustration comprises an incidence to which the edge, $e_{vm,vn}$, belongs. The edge operators satisfy the condition $E_{mn} = -E_{nm}$.

A first single-qubit Pauli operator $\sigma(e_{vm,vn}, f)$ of a first edge operator $E_{mn}$ and a second single-qubit Pauli operator $\sigma(e_{vm,vk}, f)$ of a second edge operator $E_{mk}$ acting on a common face qubit f are different if an incidence, $(e_{vm,vn}, v_m)$, associated with the first edge operator, $E_{mn}$, and an incidence, $(e_{vm,vk}, v_m)$, associated with the second edge operator, $E_{mk}$, are comprised within the same incidence frustration. A first single-qubit Pauli operator $\sigma(e_{vm,vn}, f)$ of a first edge operator $E_{mn}$ and a second single-qubit Pauli operator $\sigma(e_{vm,vk}, f)$ of a second edge operator $E_{mk}$ acting on a common face qubit f are the same if the incidence, $(e_{vm,vn}, v_m)$, associated with the first edge operator, $E_{mn}$, and the incidence, $(e_{vn,vk}, v_m)$, associated with the second edge operator, $E_{mk}$, are not comprised within the same incidence frustration.

For every every cycle in the encoding graph characterised by an ordered sequence of adjacent vertices $(v_1, v_2, \ldots, v_N)$ where $v_N = v_1$, the ordered product of associated edge operators $(i^{N-1}) \prod_{t=1}^{N-1} E_{t,t+1}$ is either a single/multi-qubit Pauli operator or an identity operator.

Such a method provides numerous advantages. For example, by encoding fermionic operators to qubit operators in this way, the required qubit operations are shown to have a low Pauli weight, especially for rectangular and hexagonal lattices. Accordingly, the control sequence required to perform the desired quantum operation comprises fewer quantum gates than it would using other, less efficient, encoding schemes. This greatly reduces the run-time of the quantum operation. In some circumstances, such a change in run-time may be the difference between being able to perform the quantum operation on a NISQ device or not being able to perform the quantum operation at all on a NISQ device. Furthermore, when such an encoding is applied to certain architectures, the full fermionic Hilbert space is encoded. Accordingly, this enables a user to perform quantum operations that other encodings do not enable.

Each incidence frustration may be associated with one or more face qubits.

Each face qubit may be associated with one incidence frustration or with multiple incidence frustrations.

In many embodiments, each edge operator may act on at most three qubits.

The encoding graph may be a planar graph.

A planar encoding graph may be representable as a rectangular lattice. In several examples as shown herein, the rectangular lattice comprises a square lattice. The encoding graph may comprise odd and even faces, wherein an odd face is a face associated with a face qubit and an even face is a face not associated with a face qubit, and wherein the faces of the rectangular lattice are alternately odd or even faces. All incidence frustrations bounding an odd face may be associated with the same face qubit. An odd face is a face for which every pair of bounding edges incident on a common vertex give rise to an incidence frustration. An even face is a face for which no pair of bounding edges give rise to an incidence frustration.

The total number of faces in the encoding graph may be even. In this case, only ≈1.5M qubits are required to encode M fermionic modes. Furthermore, this construction results in non-trivial fermionic operators such as the Fermi-Hubbard Hamiltonian, being translatable to qubit operators having a very low Pauli weight, and therefore an improved run-time. Furthermore, both odd and even fermionic operators may be encoded.

The total number of faces in the encoding graph may be odd.

The total number of odd faces may be greater than the total number of even faces. In such cases, only the even fermionic subspace is encoded.

The total number of even faces may be greater than the total number of odd faces. In such cases, there is one more face qubit than stabilizer, and accordingly four species of majorana fermion may be modelled.

A planar encoding graph may be representable as a hexagonal lattice. Every face of the hexagonal lattice may be associated with a corresponding face qubit.

A planar encoding graph may be representable as a kagome lattice.

A planar encoding graph may be representable as a 4.3.4.6 uniform tiling.

In some embodiments, an encoding graph may be a non-planar graph. For example, the encoding graph may be representable as a cubic lattice.

The fermionic quantum operator may comprise an even fermionic operator. An even fermionic operator preserves the parity of the fermionic states and so can be used to represent physical systems. The even fermionic operator may comprise a fermionic Hamiltonian operator. The fermionic Hamiltonian operator may comprise a Fermi-Hubbard Hamiltonian operator.

The fermionic quantum operator may comprise an odd fermionic operator. The odd fermionic operator may be expressible as a combination of a Majorana operator and at least one vertex operator and/or at least one edge operator.

The quantum information processor may comprise superconducting qubits or trapped ion qubits. Of course, the quantum information processor may comprise any suitable quantum information processor.

A computer-readable medium is provided. The computer-readable medium has instructions stored thereon which, when executed by one or more processors, cause the one or more processors to execute a method as described herein.

A computing device is provided. The computing apparatus comprises one or more memories. The computing apparatus further comprises one or more processors configured to execute a method of determining a control sequence as described herein.

A method is described herein for performing a quantum operation on a quantum information processor. The method comprises executing a control sequence determined according to a method of determining a control sequence as described herein.

A computer-readable medium is provided. The computer-readable medium has instructions stored thereon which, when executed by one or more processors, cause the one or more processors to execute a method as described herein.

A computing apparatus is provided. The computing apparatus comprises interaction means for interacting with qubits of a quantum information processor. The computing apparatus further comprises a controller. The controller is configured to receive a control sequence determined according to a method as described herein. The controller is further configured to control the interaction means according to the control sequence in order to perform a quantum operation on the quantum information processor.

A quantum information processor is provided. The quantum information processor comprises a plurality of qubits. The plurality of qubits comprises a plurality of vertex qubits and a plurality of face qubits. The quantum information processor further comprises an interaction module configured to perform a qubit operation on the vertex qubits and the face qubits in response to a received instruction and in accordance with an encoding characterised by an encoding graph as described herein. Each edge, $e_{vj,vk}$, of the encoding graph is incident on two vertices, $(v_j,v_k)$. Each incidence, $(e_{vj,vk},v_j)$, in the encoding graph is labelled with either a first label or a second label. Each local fermionic mode on which the fermionic quantum operator acts is associated with a corresponding vertex of the encoding graph. Each vertex qubit of the plurality of vertex qubits is associated with a corresponding vertex of the encoding graph. An incidence frustration comprises a first incidence, $(e_{vp,vq},v_p)$, and a second incidence, $(e_{vr,vp},v_p)$, on a common vertex, $v_p$, for which the label of the first incidence is the same as the label of the second incidence. Each incidence frustration is associated with a face qubit of the plurality of face qubits. Each face qubit may be associated with multiple incidence frustrations. The qubit operation is associated with a combination of at least one vertex operator and/or at least one edge operator. For a vertex, $v_s$, of the encoding graph, a corresponding vertex operator, $V_s$, consists of a single-qubit Pauli operator acting on the vertex qubit, s, associated with that vertex. An edge operator, $E_{mn}$, is associated with an ordered pair of adjacent vertices, $(v_m,v_n)$, and a corresponding pair of incidences, $(e_{vm,vn},v_m)$, $(e_{vm,vn},v_n)$. An edge operator comprises, for each vertex $v_m$ of the ordered pair of adjacent vertices, a first-type single-qubit Pauli operator, $\sigma_m^1$, acting on the vertex qubit, m, associated with the vertex $v_m$, if the corresponding incidence $(e_{vm,vn},v_m)$ is labelled with the first label, the first-type single-qubit Pauli operator different from the vertex operator, $V_m$, for that vertex. An edge operator, $E_{mn}$, further comprises, for each vertex $v_m$ of the ordered pair of adjacent vertices, a second-type single-qubit Pauli operator, $\sigma_m^2$, acting on the vertex qubit, m, associated with the vertex $v_m$ if the corresponding incidence $(e_{vm,vn},v_m)$ is labelled with the second label, the second-type single-qubit Pauli operator different from the first-type single-qubit Pauli operator and the vertex operator, $V_m$, for that vertex, $v_m$. An edge operator, $E_{mn}$, may further comprise a coefficient of +1 or −1. An edge operator, $E_{mn}$, further comprises a single-qubit Pauli operator, $\sigma(e_{vm,vn},f)$, acting on every face qubit f associated with an incidence frustration if that incidence frustration comprises an incidence to which the edge, $e_{vm,vn}$, belongs. The edge operators satisfy the condition $E_{mn}=-E_{nm}$. A first single-qubit Pauli operator $\sigma(e_{vm,vn},f)$ of a first edge operator $E_{mn}$ and a second single-qubit Pauli operator $\sigma(e_{vm,vk},f)$ of a second edge operator $E_{mk}$ acting on a common face qubit f are different if an incidence, $(e_{vm,vn},v_m)$, associated with the first edge operator, $E_{mn}$, and an incidence, $(e_{vm,vk},vm)$, associated with the second edge operator, $E_{mk}$, are comprised within the same incidence frustration. A first single-qubit Pauli operator $\sigma(e_{vm,vn},f)$ of a first edge operator $E_{mn}$ and a second single-qubit Pauli operator $\sigma(e_{vm,vk},f)$ of a second edge operator $E_{mk}$ acting on a common face qubit f are the same if the incidence, $(e_{vm,vn},v_m)$, associated with the first edge operator, $E_{mn}$, and the incidence, $(e_{vm,vk},vm)$, with th associated e second edge operator, $E_{mk}$, are not comprised within the same incidence frustration. For every every cycle in the encoding graph characterised by an ordered sequence of adjacent vertices $(V_1,V_2,\ldots,v_N)$ where $v_N=V_1$, the ordered product of associated edge operators $(i^{N-1})\Pi_{t=1}^{N-1}E_{t,t+1}$ is either a single/multi-qubit Pauli operator or an identity operator.

A computer program and/or the code/instructions for performing such methods as described herein may be provided to an apparatus, such as a computer, on a computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid-state memory, magnetic tape, a removable computer diskette, a random access memory (RAM), a read-only memory (ROM), a rigid magnetic disc, and an optical disk, such as a CD-ROM, CD-R/W or DVD.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments of the invention will now be described by way of example only, with reference to the accompanying figures in which:

FIG. 5 shows a flowchart;

FIG. 6A illustrates a planar encoding graph representable as a square lattice having an even number of faces;

FIG. 8A and FIG. 8B show non-trivial loop stabilizers for the encoding of FIG. 7A and FIG. 7B;

FIG. 9A and FIG. 9B illustrate two possible choices of encoding for a square lattice having an odd number of faces;

FIG. 13 shows a table indicating properties of the encodings described herein;

FIG. 14 shows a table comparing features of other encodings when applied to the Fermi-Hubbard Hamiltonian operator, for comparison with FIG. 13;

FIG. 15A illustrates an encoding graph representable as a kagome lattice;

FIG. 16 illustrates an encoding graph representable as a hybrid hexagonal-square lattice;

FIG. 17 illustrates an encoding graph representable as a 4.3.4.6 uniform tiling;

Throughout the description and the drawings, like reference numerals refer to like parts.

DETAILED DESCRIPTION

Figure 1:
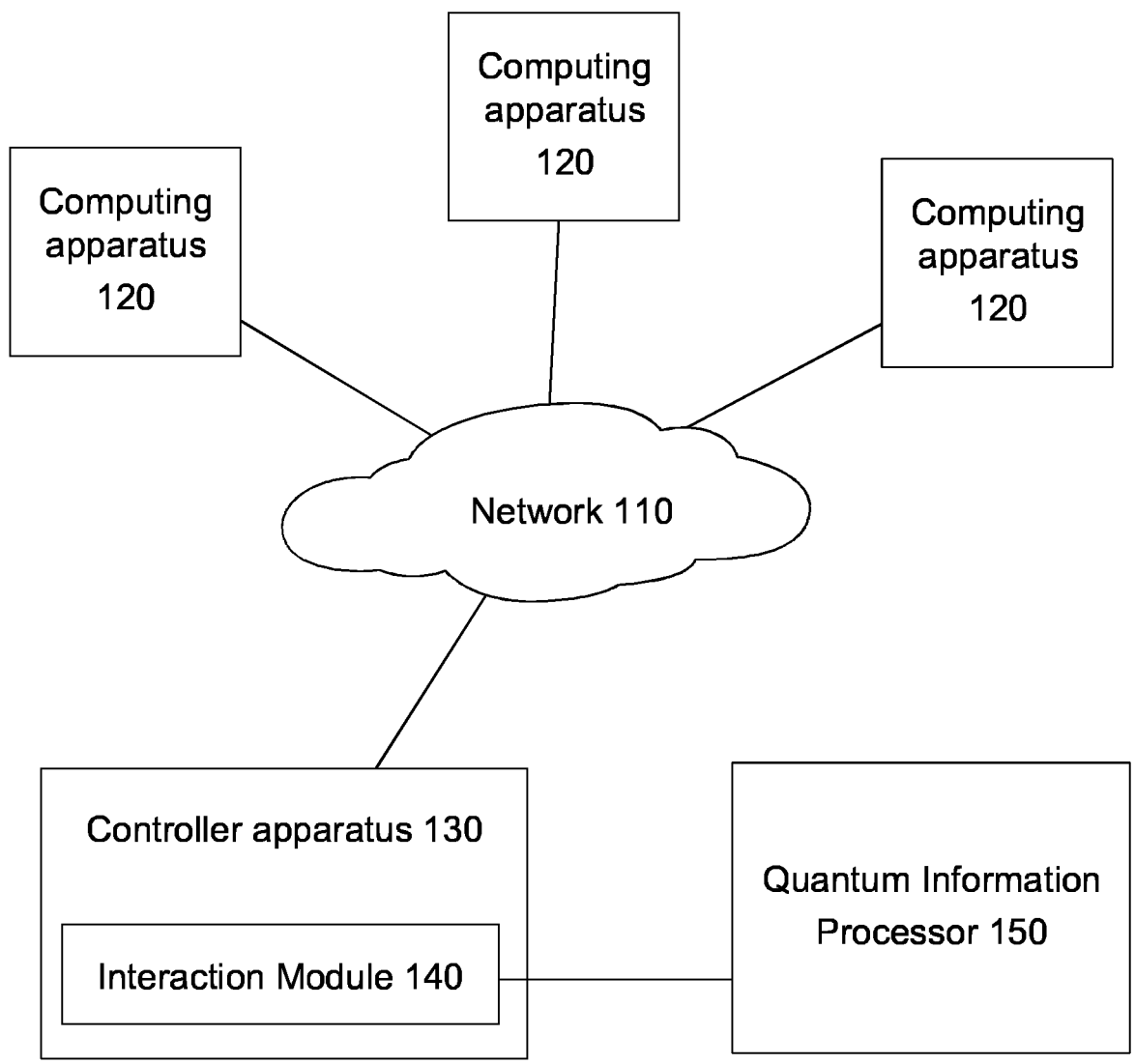
FIG. 1 illustrates a communication system including a quantum information processor.

Quantum information processing focuses on information processing and computing based on quantum mechanics. While current digital computers encode data in binary digits (bits), quantum computers are not limited to two states. They encode information as quantum bits, or qubits, which can exist in superposition. A qubit is a unit of quantum information. Qubits may be implemented with atoms, ions, photons or electrons (for example) and suitable control devices for example that work together to act as computer memory and a processor. In what follows, the terms quantum information processor and quantum computer have been used interchangeably. It is to be understood that a quantum information processor comprises a plurality of qubits and the apparatus required to maintain the qubits in a superposition state. In what follows, the term "controller apparatus" has been used to describe classical computing apparatus having, for example, classical processing capabilities and the ability to control interaction means for interacting with the qubits of the quantum information processor. In this way, a controller apparatus may control input to and receive output from the quantum information processor.

The quantum computing architecture, and accordingly the types of interaction means required to interact with the quantum information processor, do not matter for the purposes of the following discussion.

Occasionally in what follows terms from graph theory are used. A graph is a structure used to model pairwise relations between objects and is made up of vertices, also called nodes or points, which are connected by edges, also called links or lines. Two vertices (e.g. $v_m$ and $v_n$) are said to be "adjacent" if they are directly connected to each other by an edge $e_{vm,vn}$. An "incidence" is a pair $(e_{vm,vn}, v_m)$ (also sometimes written as $(v_m, e_{vm,vn})$) where $v_m$ is a vertex and $e_{vm,vn}$ an edge incident to that vertex $v_m$. A "cycle" comprises an ordered sequence of adjacent vertices, the edges between which form a closed loop. That is, a "cycle" is an ordered sequence of adjacent vertices $(v_1, v_2, \ldots, v_{N-1}, v_N)$ where $v_1 = v_N$.

In what follows, the terms "vertex qubit" and "face qubit" have been used. These terms are for labelling purposes only and there may be no physical distinction between a vertex qubit and a face qubit in the quantum information processor. Each local fermionic mode on which the fermionic quantum operator acts is associated with a corresponding vertex of the encoding graph, and each vertex qubit is associated with a corresponding vertex of the encoding graph, and so in some sense there is a direct correspondence between each local fermionic mode and a vertex qubit in the quantum information processor. Face qubits are qubits that are not associated with vertices of the encoding graph, and are so-called only because one may visualise them as relating to faces of the encoding graph if the encoding graph is planar. However, the encoding graph may be non-planar, and in non-planar graphs a face is ill-defined. Accordingly, the skilled person would appreciate that while a "vertex qubit" is a qubit associated with a vertex of the encoding graph, a "face qubit" is a qubit that is not associated with a vertex of the encoding graph.

A quantum operation may be any operation performed on a quantum information processor. A quantum operation is a step-by-step procedure for solving a problem on a quantum computer, and may also be referred to as a quantum algorithm. Many quantum operations may be characterised by a fermionic quantum operator. For example, a quantum operation may comprise the simulation of the time dynamics of a fermionic system, and the behaviour of the fermionic system may be characterised by a fermionic quantum operator in the form of a fermionic Hamiltonian. In quantum mechanics, the Hamiltonian is the operator corresponding to the total energy of the system in most cases and is usually denoted as H herein. Its spectrum is the set of possible outcomes when one measures the total energy of a system.

FIG. 1 shows a computer system 100 in accordance with the present disclosure. The computer system 100 comprises one or more computing apparatuses 120, a network 110, a controller apparatus 130 and a quantum information processor 150.

The one or more computer apparatuses 120 and the controller apparatus 130 can communicate with each other over the network 110. The network 110 may be any known type of computer network, enabling wired or wireless communication between computer apparatus 120 and the controller apparatus 130, and could be for example, a Local Area Network (LAN), a Wide Area Network (WAN), or the Internet.

The computer apparatus 120 is able to generate or store locally, or receive and transmit over the network 110, a whole or part of a control sequence for performing qubit operations on the quantum information processor 150.

The controller apparatus 130 is able to generate or receive from computing apparatus 120 a control sequence for performing operations on the quantum information processor 150. The controller apparatus 130 is able to interact directly with the quantum computer 150 via interaction module 140 according to a control sequence.

The quantum information processor 150 can be any device which is able to store and manipulate qubits. The quantum information processor 150 may have any type of architecture, and may generate qubits using any known method, including, but not limited to the following methods: nuclear magnetic resonance, ion traps, superconductors, quantum dots, electrons on liquid helium, solid-state spin spectroscopy, cavity QED. The quantum information processor may process logical qubits encoded on multiple physical qubits using a quantum error correcting code. The quantum information processor 150 may generate and manipulate qubits according to a control sequence applied by the controller apparatus 130.

The skilled person would appreciate that other set-ups to that shown in FIG. 1 may be suitable. For example, the controller apparatus 130 and the quantum information processor 150 may be combined in one unit. The computing apparatus 120 may not be necessary—for example, the controller apparatus 130 may itself perform methods for determining a control sequence as well as applying the control sequence to the quantum information processor 150.

Figure 2:
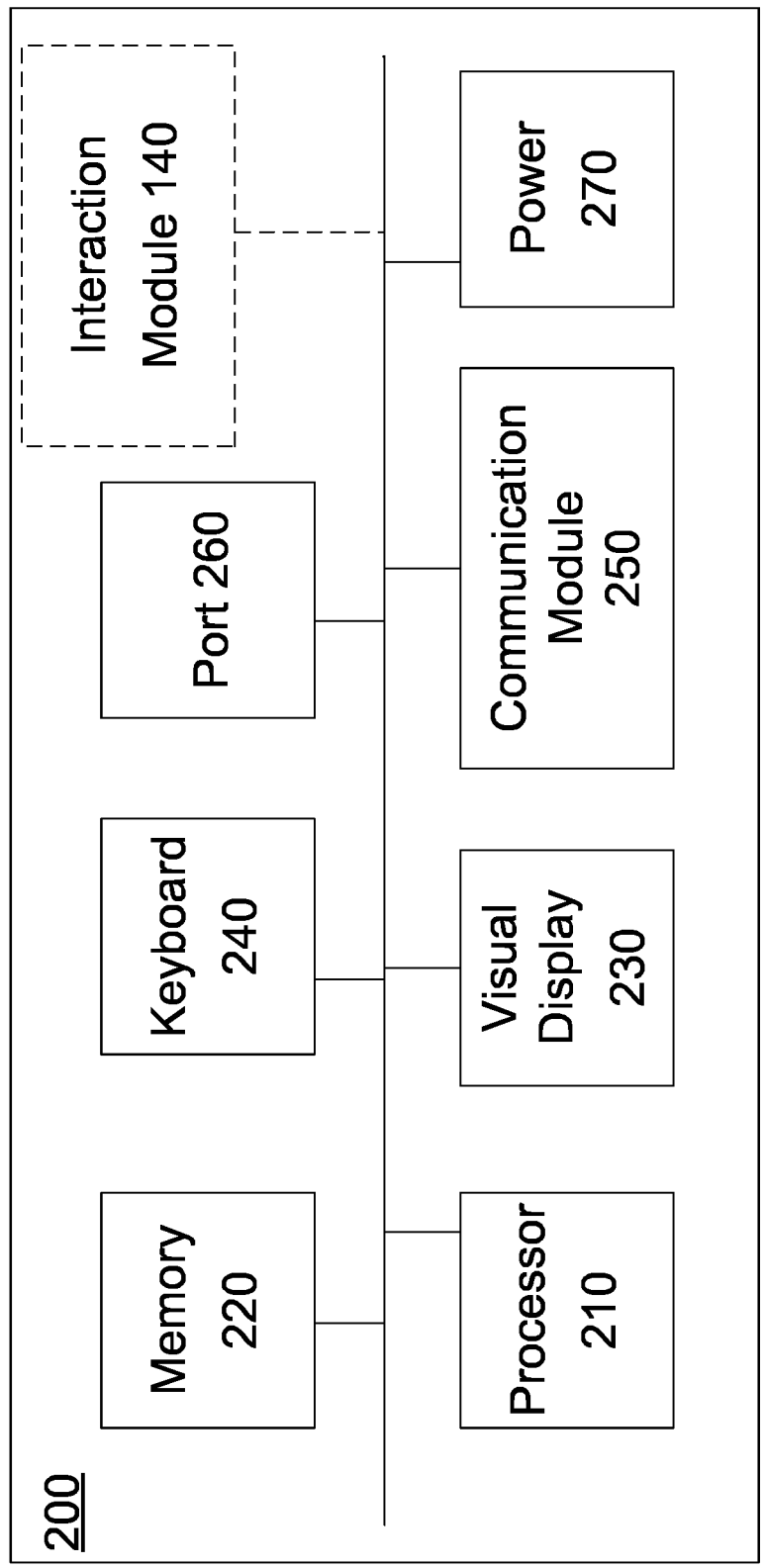
FIG. 2 shows a schematic of a computing device/computing apparatus.

FIG. 2 is a block diagram of a computing apparatus 200. For example, computing apparatus 200 may comprise a computing device, a server, a mobile or portable computer and so on. Computing apparatus 200 may be distributed across multiple connected devices. Computing apparatus 200 may be suitable for use as computing apparatus 120 of FIG. 1. Computing apparatus 200 may be suitable for use as controller apparatus 130 of FIG. 1. Other architectures to that shown in FIG. 2 may be used as will be appreciated by the skilled person.

Referring to the figure, computing apparatus 200 includes one or more processors 210, one or more memories 220, a number of optional user interfaces such as visual display 230 and virtual or physical keyboard 240, a communications module 250, and optionally a port 260 and optionally a power source 270. Each of components 210, 220, 230, 240, 250, 260, and 270 are interconnected using various busses. Processor 210 can process instructions for execution within the computing apparatus 200, including instructions stored in memory 220, received via communications module 250, or via port 260.

Memory 220 is for storing data within computing apparatus 200. The one or more memories 220 may include a volatile memory unit or units. The one or more memories may include a non-volatile memory unit or units. The one or more memories 220 may also be another form of computer-readable medium, such as a magnetic or optical disk. One or more memories 220 may provide mass storage for the computing apparatus 200. Instructions for performing a method as described herein may be stored within the one or more memories 220. For example, the memory 220 may contain instructions for determining a control sequence, or may store the control sequence, or a part thereof, generated by such a method.

The apparatus 200 includes a number of user interfaces including visualising means such as a visual display 230 and a virtual or dedicated user input device such as keyboard 240.

The communications module 250 is suitable for sending and receiving communications between processor 210 and remote systems. For example, communications module 250 may be used to send and receive communications via a communication network 110 such as the Internet.

The port 260 is suitable for receiving, for example, a non-transitory computer readable medium containing instructions to be processed by the processor 210.

The processor 210 is configured to receive data, access the memory 220, and to act upon instructions received either from said memory 220 or a computer-readable storage medium connected to port 260, from communications module 250 or from user input device 240.

In some examples, computing apparatus may include interaction module 140. The interaction module 140 is suitable for interacting with a quantum information processor/quantum computer 150. The interaction module may be used to generate an initial quantum state on the quantum information processor 150, and may be used to manipulate the qubits of the quantum information processor/quantum computer. The interaction module 140 may be used to read out a state of the quantum information processor 150. The form and characteristics of the interaction means 140 depends on the type of quantum information processor 150 being used to process quantum information, and examples of quantum information processors are described below. For example, if the quantum information processor 150 comprises an ion trap quantum computer then the interaction means 140 may comprise one or more lasers for preparing an initial quantum state via e.g. optical pumping, and may comprise apparatus for manipulating magnetic dipole transitions or stimulated Raman transitions or apparatus for manipulating electric quadrupole transitions, in order to manipulate the quantum state. For example, if the quantum computer comprises a superconducting quantum computer then the interaction means 140 may comprise circuitry to apply a voltage across a particular point in the superconducting circuit or apparatus for coordinating microwave pulses applied to the superconducting quantum computer. The quantum information processor 150 may comprise any type of quantum information processor and the corresponding interaction means 140 may comprise any means suitable for interaction with the qubits of the quantum information processor 150.

The processor 210 may be configured to control the interaction module 140 according to a control sequence. The processor 210 may determine the control sequence locally according to any method of determining a control sequence described herein, or may receive the control sequence from an external computer apparatus 120, or via a computer-readable medium with the control sequence stored thereon being connected with the port 260.

According to an example, a user of computing apparatus 120 may seek to perform a quantum algorithm on quantum information processor 150. The computing apparatus 120 may determine a control sequence for performance on a quantum information processor/quantum computer 150. The computing apparatus 120 may communicate via network 110 to controller apparatus 130 which may then control the implementation of the control sequence on the quantum information processor 150 via interaction means 140. The results may then be communicated back to the computing apparatus 120 for provision to the user. Of course, the skilled person would appreciate that the external computing apparatus 120 is not necessary—for example, the user may interact directly with the control apparatus 130.

Figure 3:
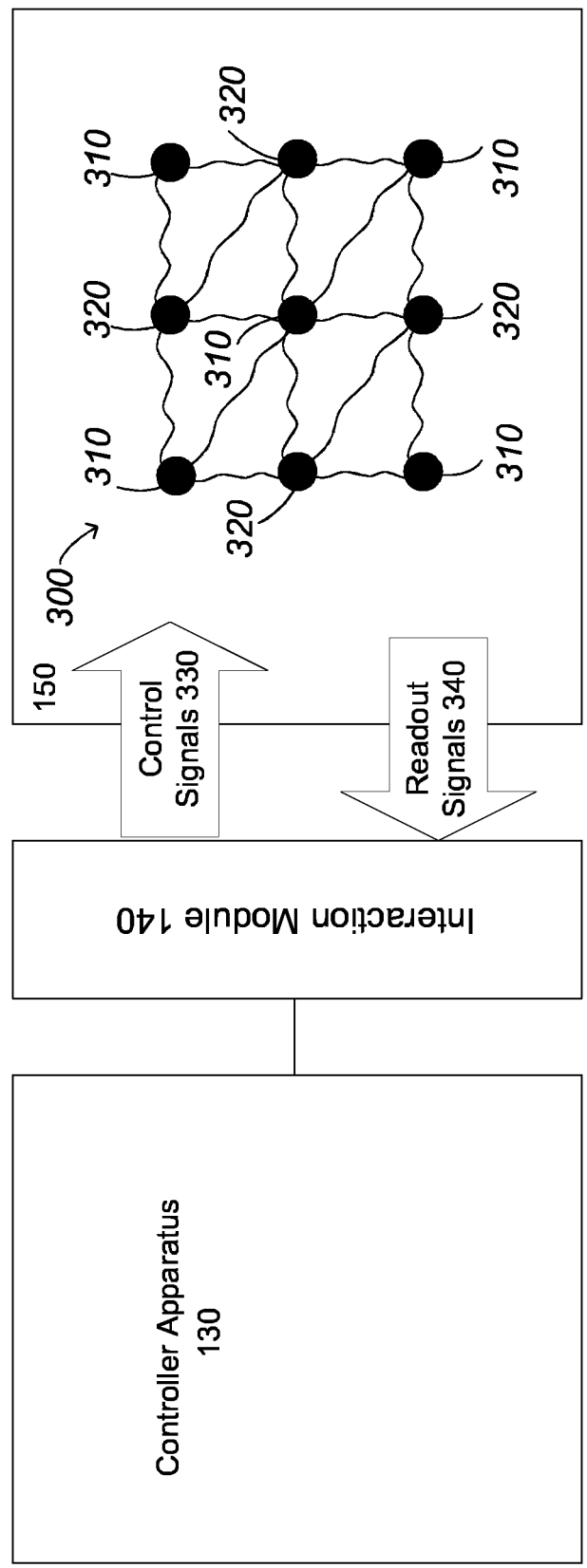
FIG. 3 illustrates a controller apparatus and quantum information processor.

FIG. 3 shows a controller apparatus 130 and quantum information processor 150 in more detail. The controller apparatus 130 is configured to control the quantum information processor 150 via interaction module 140. In FIG. 3, the interaction module 140 is shown as external to the controller apparatus 130. The interaction module 140 may be internal to the controller apparatus 130 (such as in FIG. 2) or may be external to the controller apparatus.

The quantum information processor 150 comprises a plurality of qubits 300. In FIG. 3 possible interactions between qubits are represented by the wavy lines. The plurality of qubits 300 may be denoted as vertex qubits 310 or as face qubits 320, and the choice as to whether a particular qubit is labelled as a vertex qubit or a face qubit may be arbitrary or may be based on constraints such as the physical architecture of the quantum information processor 150 or the nature of the fermionic system being mapped onto the qubits 300. The skilled person would appreciate that the quantum information processor 150 of FIG. 3 is illustrative only. The quantum information processor may comprise more or fewer qubits and the configuration of the qubits may be any suitable configuration. The controller apparatus 130 is configured to use the interaction module 140 to send control signals 330 to control the qubits 300 of the quantum information processor 150. The controller apparatus 130 is further configured to receive readout signals 340 from measurements of the quantum information processor 150. As will be described herein, each vertex qubit 310 of the plurality of qubits 300, may be associated with a vertex of an encoding graph, and thereby to a corresponding local fermionic mode.

Figure 4:
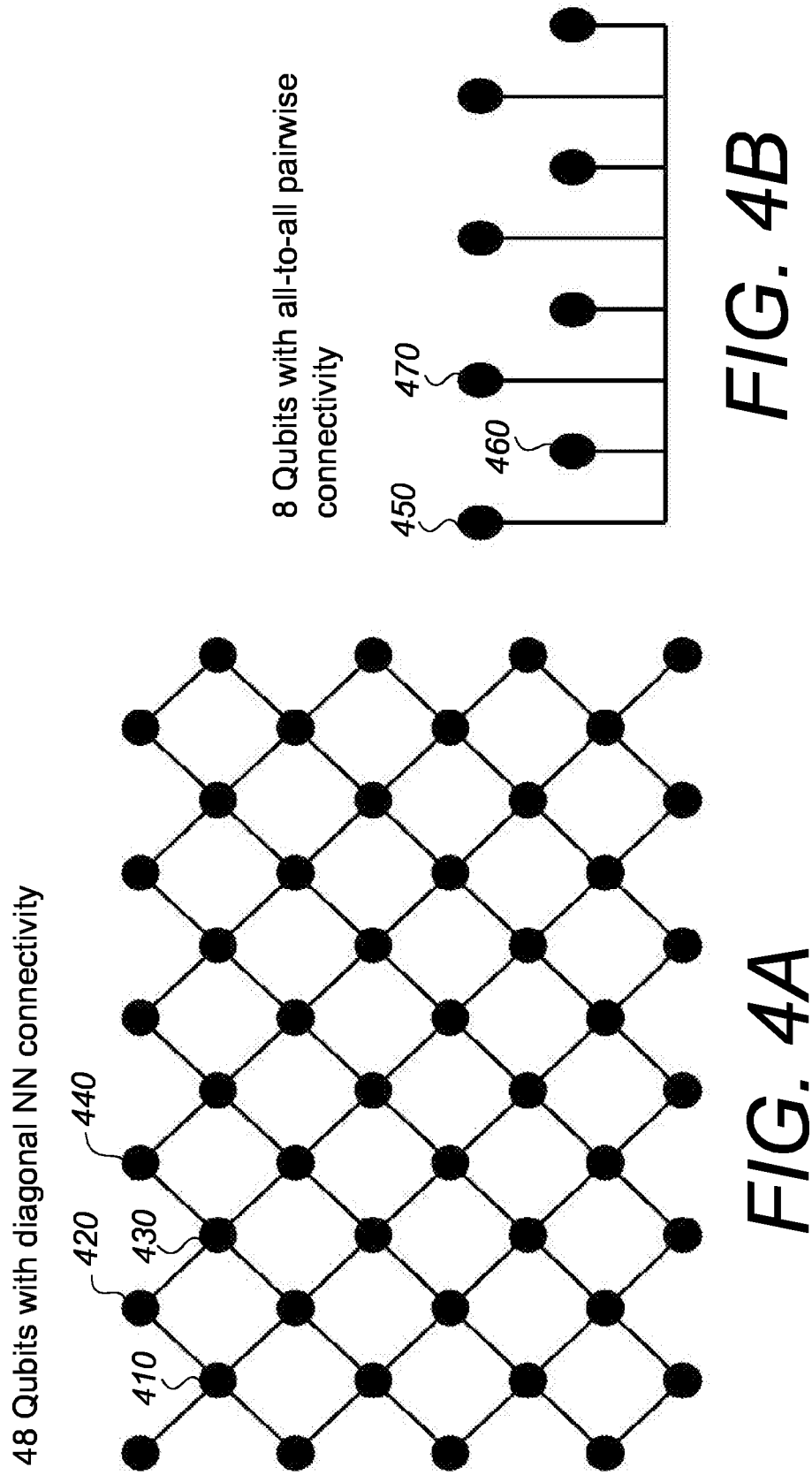
FIG. 4A illustrates qubits with nearest neighbour connectivity, for example in a superconducting quantum computer.
FIG. 4B illustrates qubits with all-to-all pairwise connectivity, for example in a trapped ion quantum computer.

FIG. 4A illustrates an array of qubits according to a quantum computing architecture in which the qubits have only diagonal nearest neighbour connectivity. Such a lattice arrangement of qubits is common in, for example, quantum computers based on superconducting qubits. FIG. 4A illustrates 48 qubits (represented by black dots including qubits 410, 420, 430, 440). The lines connecting the qubits represent the allowed interactions between the qubits. For this type of architecture, the type of 2-qubit interactions are limited by the physical locations of the qubits, such that the quantum information processor 150 can only perform 2-qubit interactions on two diagonally neighbouring qubits. In contrast, FIG. 4B illustrates an array of qubits according to a quantum computing architecture in which the qubits have all-to-all pairwise connectivity. Such an arrangement of qubits is common in, for example, quantum computers based on trapped ions. The black dots represent qubits and the lines connecting the qubits represent the allowed interactions between the qubits. For this type of architecture, the type of 2-qubit interactions are not restricted by the qubit location and any pairwise interaction of qubits may be performed. The architectures shown in FIG. 4A and FIG. 4B may both be mapped to an encoding graph representable as, for example, a square lattice.

Second quantization, also referred to as occupation number representation, is a formalism used to describe and analyze quantum many-body systems. Under second quantization, the quantum many-body states are represented in the Fock state basis, which are constructed by filling up each single-particle state with a certain number of identical particles. The second quantization formalism would be known to the skilled person and introduces the creation and annihilation operators to construct and handle the Fock states. The single-particle states of a fermionic system are referred to herein as fermionic modes.

In a fermionic system comprising M fermionic modes, the associated fermionic Fock space comprises $2^M$ basis vectors $|v_1, v_2, \ldots, v_M\rangle$ where $v_j \in \{0, 1\}$ indicates the presence ($v_j=1$) or absence ($v_j=0$) of a fermionic particle in mode j. One essential component in realizing simulations of fermionic models on quantum computers is the representation of such models in terms of qubits and quantum gates. A fermion-to-qubit mapping, also known as a fermion-to-qubit encoding, is therefore an essential ingredient in the simulation of fermionic systems on quantum devices. A fermion-to-qubit encoding (sometimes herein referred to simply as an "encoding") is a mapping of M fermionic modes onto N qubits and the mapping of fermionic quantum operators (which act on fermionic modes) to qubit operators (which act on qubits). An example of an encoding is the trivial one in which M=N and qubits are used to represent the binary string $\chi=(v_1, v_2, \ldots, v_N)^T$. Quantum operations on fermionic systems can be characterised entirely by fermionic quantum operators, which can in turn be described by the actions of the annihilation operators $a_j^\dagger$ and creation operators at that satisfy the anticommutation relations $$[a_j, a_k]_+ = 0 \quad (1)$$

$$[a_j^\dagger, a_k^\dagger]_+ = 0 \quad (2)$$

$$[a_j, a_k^\dagger]_+ = \delta_{jk} \quad (3)$$

where $[A,B]_+ = AB+BA$ and $\delta_{jk}$ is the Kronecker delta. The annihilation operators act on the fermionic Fock space as:

$$a_j|v_1, v_2, \ldots, v_{j-1}, 1, v_{j+1}, \ldots, v_N\rangle = (-1)^{\Sigma_{s=0}^{j-1} v_s}|v_1, v_2, \ldots, v_{j+1}, v_N\rangle \quad (4)$$

$$a_j|v_1, v_2, \ldots, v_{j-1}, 0, v_{j+1}, \ldots, v_N\rangle \quad (5)$$

and $a_j^\dagger$ is the Hermitian conjugate of $a_j$. The Hilbert space of M local fermionic modes may be split into even and odd subspaces. That is, the Hilbert space $\mathfrak{H} = \mathfrak{H}_0 \oplus \mathfrak{H}_1$ where "0" and "1" here refer to the total fermionic parity of the Fock state, $\Sigma_{j=1}^N \pmod 2$.

A fermionic quantum operator is herein referred to as an even fermionic operator if it preserves the parity of the Fock states. Even fermionic operators are therefore quantum operators which may be written as a sum of products of even numbers of creation/annihilation operators—that is, they may be written as a sum of products of $a_k^\dagger a_k$, $a_j^\dagger a_k$, $a_j a_k$, and $a_j^\dagger a_k^\dagger$. All natural fermionic Hamiltonian operators are examples of even fermionic operators. For example, an action by an external potential may be written as $\beta a_j^\dagger a_j$ where $\beta$ is a real-valued parameter. For example, fermionic hopping may be described by the Fermionic operator $\gamma a_j^\dagger a_k +$ $\gamma^* a_k^\dagger a_j$ where $\gamma$ is a complex-valued parameter and $\gamma^*$ is the complex conjugate of $\gamma$.

In contrast, a fermionic operator is herein referred to as an odd fermionic operator if it does not preserve the parity of the Fock states. Odd fermionic operators are therefore quantum operators including at least one term which may be written as a product of an odd number of creation/annihilation operators.

Single-qubit operations may be described with the use of Pauli operations, which are described by the Pauli matrices X, Y, Z. The Pauli matrices are given by:

$$X = \begin{pmatrix} 0 & 1 \\ 1 & 0 \end{pmatrix} \tag{6}$$

$$Y = \begin{pmatrix} 0 & -i \\ i & 0 \end{pmatrix} \tag{7}$$

$$Z = \begin{pmatrix} 1 & 0 \\ 0 & -1 \end{pmatrix} \tag{8}$$

Fermion-to-qubit encodings are an essential ingredient in the simulation of fermionic systems on quantum devices. Early encodings [JW,BK02] map systems of M fermionic modes to M qubits; however in these encodings local fermionic interactions are mapped to non-local operators whose support scales with system size. Under these encodings, a fermionic quantum operator acting on two adjacent fermionic modes may be translated to a qubit operator acting on significantly more qubits, with corresponding costs in circuit depth and therefore run-time. To resolve this issue a number of encodings have been developed with the general goal of preserving the geometric locality of operators [BK02, VC05, WHT16, JMBN18, SW19, SBMW19]. That is, the encodings aim to translate local fermionic interactions to local qubit interactions. Much of the focus of recent work has been to construct encodings of this type for specific hardware layouts, for general graphs, to improve the code distance, or else to minimize qubit number.

The primary near term challenge for quantum computing devices is decoherence and the lack of quantum error correction, which severely limits run-times of quantum algorithms. This is in contrast to qubit numbers, which have been steadily rising. One of the factors that affect the run-time of a fermionic quantum simulation is the Pauli weights of the fermionic quantum operators that characterise a quantum operation. This is particularly true for near term analogue quantum simulation schemes. As such it may be prudent to design fermion to qubit encodings which minimize the Pauli weight of terms in the fermionic systems being simulated, even potentially at the expense of qubit number, generality or planarity of interaction graph, or code distance. A Pauli weight of a quantum operation is the number of Pauli matrices in that quantum operation. For example, if an operation comprises an n-length Pauli string representing a tensor product of n operators comprising Pauli matrices and identity matrices (no action) then the weight of the string is the number of Pauli matrices in the string.

FIG. 5 shows a flowchart of a computer-implemented method 500 of determining a control sequence for performing a quantum operation on a quantum information processor, such as quantum information processor 150 of FIG. 1 or FIG. 3, the quantum information processor 150 comprising a plurality of qubits 300, which are identified as a plurality of vertex qubits 310 and a plurality of face qubits 320. The quantum operation is characterised by a fermionic quantum operator for acting on local fermionic modes. For example, the fermionic quantum operator may comprise a Hamiltonian of a fermionic system.

At 510, the fermionic quantum operator is translated to a qubit operator for acting on the plurality of qubits 300, using a fermion-to-qubit encoding. In particular, the fermion-to-qubit encoding may be characterised by an appropriate encoding graph. The encoding graph comprises a plurality of vertices and edges. Each edge, $e_{vj,vk}$, of the encoding graph is incident on two vertices, $(v_j, v_k)$. Each incidence, $(e_{vj,vk}, v_j)$, in the encoding graph is labelled with either a first label or a second label.

In translating the fermionic operator to a qubit operator, each local fermionic mode on which the fermionic quantum operator acts is implicitly or explicitly associated with a corresponding vertex qubit 310 of the quantum information processor 150. With reference to the encoding graph, each local fermionic mode is associated with a corresponding vertex of the encoding graph, and each vertex qubit is also associated with a corresponding vertex of the encoding graph.

An incidence frustration comprises a first incidence, $(e_{vp,vq}, v_p)$, and a second incidence, $(e_{vr,vp}, v_p)$, on a common vertex, $v_p$, for which the label of the first incidence is the same as the label of the second incidence. Each incidence frustration is associated with a face qubit of the plurality of face qubits. Each face qubit may be associated with multiple incidence frustrations.

The qubit operator is associated with a combination of at least one vertex operator and/or at least one edge operator.

For a vertex, $v_s$, of the encoding graph, a corresponding vertex operator, $V_s$, consists of a single-qubit Pauli operator acting on the vertex qubit, s, associated with that vertex. For example, the vertex operator, $V_s$, for a first vertex, $v_s$, may be a Pauli-Z operation (representable by the Pauli Z matrix), while a vertex operator, $V_t$, for a second vertex, $v_t$, may be a Pauli-X operation (representable by the Pauli X matrix). In some embodiments, the vertex operators of all vertices of the encoding graph are the same, while in other embodiments, the vertex operators may vary from vertex to vertex.

An edge operator, $E_{mn}$, is associated with an ordered pair of adjacent vertices, $(v_m, v_n)$, and a corresponding pair of labelled incidences, $(e_{vm,vn}, v_m)$, $(e_{vm,vn}, v_n)$. An edge operator comprises, for each vertex $v_m$ of the ordered pair of adjacent vertices, a first-type single-qubit Pauli operator, $\sigma_m^1$, acting on the vertex qubit, m, associated with the vertex $v_m$ if the corresponding incidence $(e_{vm,vn}, v_m)$ is labelled with the first label, the first-type single-qubit Pauli operator different from the vertex operator, $V_m$, for that vertex. An edge operator, $E_{mn}$, further comprises, for each vertex $v_m$ of the ordered pair of adjacent vertices, a second-type single-qubit Pauli operator, $\sigma_m^2$, acting on the vertex qubit, m, associated with the vertex $v_m$ if the corresponding incidence $(e_{vm,vn}, v_m)$ is labelled with the second label, the second-type single-qubit Pauli operator different from the first-type single-qubit Pauli operator and the vertex operator, $V_m$, for that vertex, $v_m$. For example, if the vertex operator, $V_m$ associated with the vertex $v_m$ is a Pauli-Z operator, Z, then the first-type single qubit Pauli operator and the second-type single-qubit Pauli operator may be respectively a Pauli-X operation (X) and a Pauli-Y operation (Y) (or vice versa).

An edge operator, $E_{mn}$, may further comprise a coefficient of +1 or −1. An edge operator, $E_{mn}$, further comprises a single-qubit Pauli operator, a $(e_{vm,vn}, f)$, acting on every face qubit f associated with an incidence frustration if that incidence frustration comprises an incidence to which the edge, $e_{vm,vn}$, belongs. The edge operators satisfy the condition $E_{mn} = -E_{nm}$.

A first single-qubit Pauli operator $\sigma(e_{vm,vn}, f)$ of a first edge operator $E_{mn}$ and a second single-qubit Pauli operator $\sigma(e_{vm,vk}, f)$ of a second edge operator $E_{mk}$ acting on a common face qubit f are different if an incidence, $(e_{vm,vn}, v_m)$, associated with the first edge operator, $E_{mn}$, and an incidence, $(e_{vm,vk}, v_m)$, with th associated e second edge operator, $E_{mk}$, are comprised within the same incidence frustration. A first single-qubit Pauli operator $\sigma(e_{vm,vn}, f)$ of a first edge operator $E_{mn}$ and a second single-qubit Pauli operator $\sigma(e_{vm,vk}, f)$ of a second edge operator $E_{mk}$ acting on a common face qubit f are the same if the incidence, $(e_{vm,vn}, v_m)$, associated with the first edge operator, $E_{mn}$, and the incidence, $(e_{vm,vk}, v_m)$, associated with the second edge operator, $E_{mk}$, are not comprised within the same incidence frustration.

For every every cycle in the encoding graph characterised by an ordered sequence of adjacent vertices $(v_1, v_2, \ldots, v_N)$ where $v_N = V_1$, the ordered product of associated edge operators $(i^{N-1})\Pi_{t=1}^{N-1} E_{t,t+1}$ is either a single/multi-qubit Pauli operator or an identity operator.

A fermionic operator may accordingly be translated to a qubit operator. For example, and with reference to FIG. 4B, the fermionic quantum operator may define an operation involving the two fermionic modes associated (via the encoding graph) with vertex qubits 450 and 460. The qubit operator may comprise an edge operation between the vertex pair representing vertex qubits 450 and 460. Accordingly, the edge operator may comprise a first-type Pauli operation acting on qubit 450 and a second-type Pauli interaction acting upon qubit 460, and depending on the topology of the encoding graph, may also comprise an operation on a face qubit such as qubit 470.

At 520, the method comprises determining from the qubit operator a control sequence for performing the quantum operation on the quantum information processor 150. The control sequence will depend on the particular architecture of the underlying quantum system and defines the sequence and timings of operations that must be performed on the quantum information processor. For example, in a trapped ion quantum computer, qubits are often defined using two ground state hyperfine levels (hyperfine qubits) or a ground state level and an excited state level (optical qubits) of an ion. Single qubit operations (e.g. Pauli-type operations) are often done using magnetic dipole transitions or stimulated Raman transitions for hyperfine qubits and electric quadrupole transitions for optical qubits. The single qubit operations are usually performed by manipulating the frequency of an external electromagnetic field and exposing chosen ions to the field for a specific amount of time. Measuring the state of the qubit stored in an ion may be performed using lasers. Typically, a laser is applied to the ion that couples only one of the qubit states. When the ion collapses into this state during the measurement process, the laser will excite it, resulting in a photon being released when the ion decays from the excited state. After decay, the ion is continually excited by the laser and repeatedly emits photons. These photons can be collected by a photomultiplier tube (PMT) or a charge-coupled device (CCD) camera. If the ion collapses into the other qubit state, then it does not interact with the laser and no photon is emitted. By counting the number of collected photons, the state of the ion may be determined with a very high accuracy (>99.9%).

Accordingly, at 520 a control sequence is determined based on the qubit operator. If the qubit operator specifies for example a Pauli-X gate, X, acting on vertex qubit 450 and a Pauli-Y gate Y acting on vertex qubit 460 of a trapped ion quantum computer represented by FIG. 4B, then the control sequence may specify the order, timings, electromagnetic field frequencies etc. required to implement those operations on the underlying ions.

For superconducting quantum computers, single qubit operations are usually induced by microwave pulses sent to an antenna or transmission line coupled to a qubit with a frequency resonant with the energy separation between states. Individual qubits may be addressed by a dedicated transmission line or by a shared line if other qubits are off resonance. The axis of rotation (about the Bloch sphere) is often set by quadrature amplitude modulation of the microwave pulse, while the pulse length may determine the angle of rotation.

Of course, the skilled person would appreciate that other quantum information processor architectures may be used and accordingly the control sequence will be modified accordingly.

The skilled person would appreciate that a quantum computer may be configured such that a mapping as described herein is built into the quantum computer. For example, the quantum information processor may comprise vertex qubits and face qubits and an interaction module, the interaction module configured to perform a qubit operation on the vertex qubits and the face qubits in response to a received instruction and in accordance with an encoding characterised by an encoding graph as described herein.

One of the more likely fermionic systems to be simulated on near term devices is the Fermi-Hubbard model on a regular lattice. In what follows, two fermion-to-qubit encodings designed for square and hexagonal lattices are presented. The maximum Pauli weights of the terms in the Fermi-Hubbard model under this encoding are smaller than those of any other encoding to date. The square and hexagonal encodings lead to Fermi-Hubbard terms which are at most Pauli weight 3. The number of qubits in these encodings are less than 1.5 times the number of fermionic modes. A summary is given in the table shown in FIG. 11. No other fermion-to-qubit encodings are known to have such a small upper bound on the Pauli weight of the Fermi-Hubbard terms (see the table shown in FIG. 12), or for that matter on the generators of the even fermionic algebra. Furthermore no other local fermionic encodings employ as few qubits per mode. It should be noted that these codes neither correct nor detect every single qubit error. Furthermore these codes do not consider any particular interaction geometry of the hardware.

It is noted that headings and/or subheadings are utilised herein for explanation purposes only and are not intended to limit the scope of the invention.

The Even Fermionic Algebra

All natural fermionic Hamiltonians are sums of products of even fermionic operators $a_k^\dagger a_k$, $a_j^\dagger a_k$, $a_j a_k$ and $a_j^\dagger a_k^\dagger$. Here $a_k^\dagger$ and $a_k$ are the standard fermionic creation and annihilation operators respectively. The algebra of such even fermionic operators can be generated by the edge operators $E_{jk}$ and vertex operators which satisfy the following relations:

$$V_j^\dagger = V_j, \; E_{jk}^\dagger = E_{jk}, \; V_j^2 = 1, \; E_{jk}^2 = 1, \; E_{jk} = -E_{kj} \quad (9)$$

$$i \neq j \neq k \neq m \neq n: [V_j, V_k] = 0, \; [E_{ij}, V_k] = 0, \; [E_{ij}, E_{mn}] = 0 \quad (10)$$

$$[E_{jk}, V_j]_+ = 0, \; [E_{ij}, E_{jk}]_+ = 0 \quad (11)$$

$$\forall \text{ loops } p: i^{|p-1|} \prod_{i=1}^{|p-1|} E_{p_i p_{i+1}} = 1 \quad (12)$$

where $[A,B]=AB-BA$ and $[A,B]_+=AB+BA$. This can be most readily seen by employing the Majorana algebra $$\gamma_k = a_k + a_k^\dagger \quad \overline{\gamma}_k = \frac{(a_k - a_k^\dagger)}{i}$$

$$a_k = \frac{\gamma_k + i\overline{\gamma}_k}{2} \quad a_k^\dagger = \frac{\gamma_k - i\overline{\gamma}_k}{2}$$

to define the edge and vertex operators $$E_{jk} := -i\gamma_j \gamma_k, \; V_j := -i\gamma_j \overline{\gamma}_j$$

where $\gamma_i$ and $\overline{\gamma}_k$ represent Majorana operators, and then reconstructing the even fermionic operators $$a_k^\dagger a_k = \frac{(1-V_k)}{2} \qquad a_j^\dagger a_k = \frac{i}{4}(1-V_j)(1+V_k)E_{jk}$$

$$a_j a_k = \frac{i}{4}(1+V_j)(1+V_k)E_{jk} \quad a_j^\dagger a_k^\dagger = \frac{i}{4}(1-V_j)(1-V_k)E_{jk}$$

An encoded majorana operator is a qubit operator that satisfies all of the same algebraic relations to the encoded edge and vertex operators as the majorana operator does to the fermionic edge and vertex operators.

The Fermi-Hubbard model on a square lattice with spin-spin interaction is given by the Hamiltonian $$H = \sum_{(i,j),\sigma \in \{\uparrow,\downarrow\}} a_{i,\sigma}^\dagger a_{j,\sigma} + a_{j,\sigma}^\dagger a_{i,\sigma} + \sum_i a_{i\uparrow}^\dagger a_{i\uparrow} a_{i\downarrow}^\dagger a_{i\downarrow} \quad (13)$$

It is important to note that in the Fermi-Hubbard model there is no particle exchange between spin sectors. Therefore one does not need to encode edge operators between the modes in different spin sectors. For the sake of clarity the layout of encodings for one spin sector is presented, which takes the form of a 2D planar graph. One may imagine performing an encoding on the other spin sector and layering it on top of the first, so that the spins on the same sites are near one another. This leads to a non-planar encoding graph.

One can expand the hopping term into edge and vertex operators, temporarily dropping the uniform spin index.

$$a_i^\dagger a_j + a_j^\dagger a_i = \frac{-i}{2}(E_{ij}V_j + V_i E_{ij}) \quad (14)$$

One can then can expand the spin-spin interaction as $$a_{i\uparrow}^\dagger a_{i\uparrow} a_{i\downarrow}^\dagger a_{i\downarrow} = \frac{1}{4}(1 - V_{i,\uparrow})(1 - V_{i,\downarrow}) \quad (15)$$

It is not difficult to see from the above expressions that the weight of every term is at most 3 in this encoding.

Square Lattice Encoding

FIG. 6A illustrates a planar encoding graph that is representable as a square lattice. In the particular example, shown in FIG. 6A, the encoding graph comprises nine vertices, labelled $v_1$ to $v_9$, and twelve edges. In the example shown, the encoding graph has four faces.

Consider fermions on a square lattice. One may choose to encode these fermions onto qubits using an encoding characterised by the encoding graph of FIG. 6A. Accordingly, one may associate each local fermionic mode with a corresponding vertex of the encoding graph and one may also associate each vertex $v_j$ of the encoding graph with a corresponding vertex qubit j of a quantum information processor. Accordingly, for each fermionic mode, there is an associated qubit of a quantum information processor.

Each incidence comprising a vertex and an edge is given one of two labels. In the example, of FIG. 6A, each incidence is labelled with either a first label "X" or a second label "Y". An incidence frustration comprises a first incidence, $(e_{vp,vq}, v_p)$, and a second incidence, $(e_{vr,vp}, v_p)$, on a common vertex, $v_p$, for which the label of the first incidence is the same as the label of the second incidence. Accordingly, as can be seen in FIG. 6A, the labellings of incidences involving any of vertices $v_1$, $v_2$, $v_4$, $v_5$, $v_6$, $v_8$ and $v_9$ give rise to incidence frustrations.

Each incidence frustration is associated with a face qubit. In FIG. 6A, two face qubits, f and f' are illustrated, and in this example each face qubit is associated with multiple incidence frustrations. In particular, the incidence frustrations involving each of $v_1$, $v_2$, and $v_4$ are associated with the face qubit f and the incidence frustrations involving each of $v_6$, $v_8$, and $v_9$ are associated with the face qubit f'. There are two incidence frustrations involving the vertex $v_5$; the first (two "X" labels) is associated with the face qubit f and the second (two "Y" labels) is associated with the face qubit f'. In the example of a square lattice, the term "odd face" may be used to refer to a face for which the bounding edges are comprised within incidence frustrations, while the term "even face" may be used to refer to a face for which the bounding edges are not comprised within incidence frustrations. In the diagram of FIG. 6A, the faces containing the face qubits f and f' are accordingly odd faces, while the faces not containing a face qubit are even faces.

The encoding graph may be used to translate fermionic operators into qubit operators by defining vertex operators and edge operators. For a vertex $v_s$ of the encoding graph, a corresponding vertex operator, $V_s$, consists of a single-qubit Pauli operator acting on the vertex qubit, s, associated with that vertex. Accordingly, the vertex operator $V_s$ specifies a single-qubit Pauli operator for acting on vertex qubit s associated with vertex $v_s$. While the vertex operators may vary from vertex to vertex, for clarity in this example all vertex operators are chosen to be the Pauli-Z operator. That is, $V_s = Z$ for all s.

An edge operator $E_{mn}$ is associated with an ordered pair of adjacent vertices $(v_m, v_n)$ and a corresponding pair of incidences $(e_{vm,vn}, v_m)$, $(e_{vm,vn}, v_n)$. For example, the edge operator $E_{12}$ is associated with the ordered pair of adjacent vertices $v_1$ and $v_2$ and the corresponding pair of incidences $(e_{v1,v2}, v_1)$ and $(e_{v1,v2}, v_2)$. For each vertex of the ordered pair of adjacent vertices, the edge operator comprises a first-type single-qubit Pauli operator $\sigma_m^1$ acting on the vertex qubit, m, associated with that vertex $v_m$ if the corresponding incidence $(e_{vm,vn},v_m)$ is labelled with the first label. It is a requirement that the first-type single-qubit Pauli operator $\sigma_m^1$ acting on the vertex qubit, m is different from the vertex operator $V_m$ that is defined to act on vertex qubit m. For example, the incidence $(e_{v1,v2},v_1)$ is labelled with an "X" and so the edge operator $E_{12}$ comprises a first-type Pauli operator $\sigma_1^1$ that acts on the qubit 1 associated with vertex $v_1$. As the vertex operator $V_1$ is a Pauli-Z operator, the first-type Pauli operator must be different from a Pauli-Z operator. In this example, the first-type Pauli operator defined to act on the vertex qubit 1 associated with vertex $v_i$ is a Pauli-X operator i.e. $\sigma_1^1 = X$. For simplicity of explanation only, the label "X" in FIG. 6A is always associated with a Pauli-X operation.

For each vertex of the ordered pair of adjacent vertices, the edge operator $E_{mn}$ comprises a second-type single-qubit Pauli operator $\sigma_m^2$ acting on the vertex qubit, m, associated with that vertex $v_m$ if the corresponding incidence $(e_{vm,vn}, v_m)$ is labelled with the second label. It is a requirement that the second-type single-qubit Pauli operator $\sigma_m^2$ acting on the vertex qubit, m is different from the vertex operator $V_m$ that is defined to act on vertex qubit m and also different from the first-type single-qubit Pauli operator. In the example of FIG. 6A, this means that the edge operator $E_{12}$ comprises a second-type single-qubit Pauli operator on vertex qubit 2 associated with vertex $v_2$. For simplicity of explanation only, the label "Y" in FIG. 6A is always associated with a Pauli-Y operation, and accordingly, $\sigma_2^2 = Y$.

An edge operator $E_{mn}$ further comprises a single-qubit Pauli operator $\sigma(e_{vm,vn},f)$ to act on any face qubit associated with an incidence frustration if that incidence frustration comprises an incidence to which the edge belongs. For edge operator $E_{12}$ there are two incidence frustrations, and both are associated with face qubit f. Accordingly, $E_{12}$ further comprises a single-qubit Pauli operation on the face qubit f. In contrast, the edge operator $E_{23}$ does not comprise an operator acting on a face qubit as there are no incidence frustrations comprising the edge $e_{v2,v3}$.

A first single-qubit Pauli operator $\sigma(e_{vm,vn},f)$ of a first edge operator $E_{mn}$ and a second single-qubit Pauli operator $\sigma(e_{vm,vk},f)$ of a second edge operator $E_{mk}$ acting on a common face qubit f are different if an incidence $(e_{vm,vn},v_m)$ associated with the first edge operator $E_{mn}$ and an incidence $(e_{vm,vk},vm)$ associated with the second edge operator $E_{mk}$ are comprised within the same incidence frustration. For example, there is an incidence frustration involving vertex $v_1$ that comprises incidences $(e_{v1,v2},v_1)$ and $(e_{v1,v4},v_1)$ and accordingly the single-qubit Pauli operator $\sigma(e_{v1,v2},f)$ that acts on face qubit f as part of edge operator $E_{12}$ is necessarily different from the single-qubit Pauli operator $\sigma(e_{v1,v4},f)$ that acts on face qubit f as part of edge operator $E_{14}$. A first single-qubit Pauli operator $\sigma(e_{vm,vn},f)$ of a first edge operator $E_{mn}$ and a second single-qubit Pauli operator $\sigma(e_{vm,vk},f)$ of a second edge operator $E_{mk}$ acting on a common face qubit f are the same if an incidence $(e_{vm,vn},vm)$ associated with the first edge operator $E_{mn}$ and an incidence $(e_{vm,vk},vm)$ associated with the second edge operator $E_{mk}$ are not comprised within the same incidence frustration. For example, the single-qubit Pauli operator $\sigma(e_{v1,v2},f)$ that acts on face qubit f as part of edge operator $E_{12}$ is the same as the single-qubit Pauli operator $\sigma(e_{v4,v5},f)$ that acts on face qubit f as part of edge operator $E_{45}$. In the example of FIG. 6A, the face qubit operations are either Pauli-X operations or Pauli-Y operations.

An edge operator may further comprise a coefficient of +1 or −1 and satisfies the relationship $E_{mn} = -E_{nm}$. Furthermore, the labels of the encoding graph and corresponding first-type and second-type single-qubit Pauli operations are chosen such that for every cycle of the encoding graph characterised by an ordered sequence of adjacent vertices $(v_1, v_2, \ldots, v_N)$ where $v_N = v_1$, the ordered product of associated edge operators $(i^{N-1}) \prod_{t=1}^{N-1} E_{t,t+1}$ is either a single/multi-qubit Pauli operator or an identity operator. For example, $(i^4) \times E_{14} \times E_{45} \times E_{52} \times E_{21}$ is equal to the identity operator.

Figure 6B:
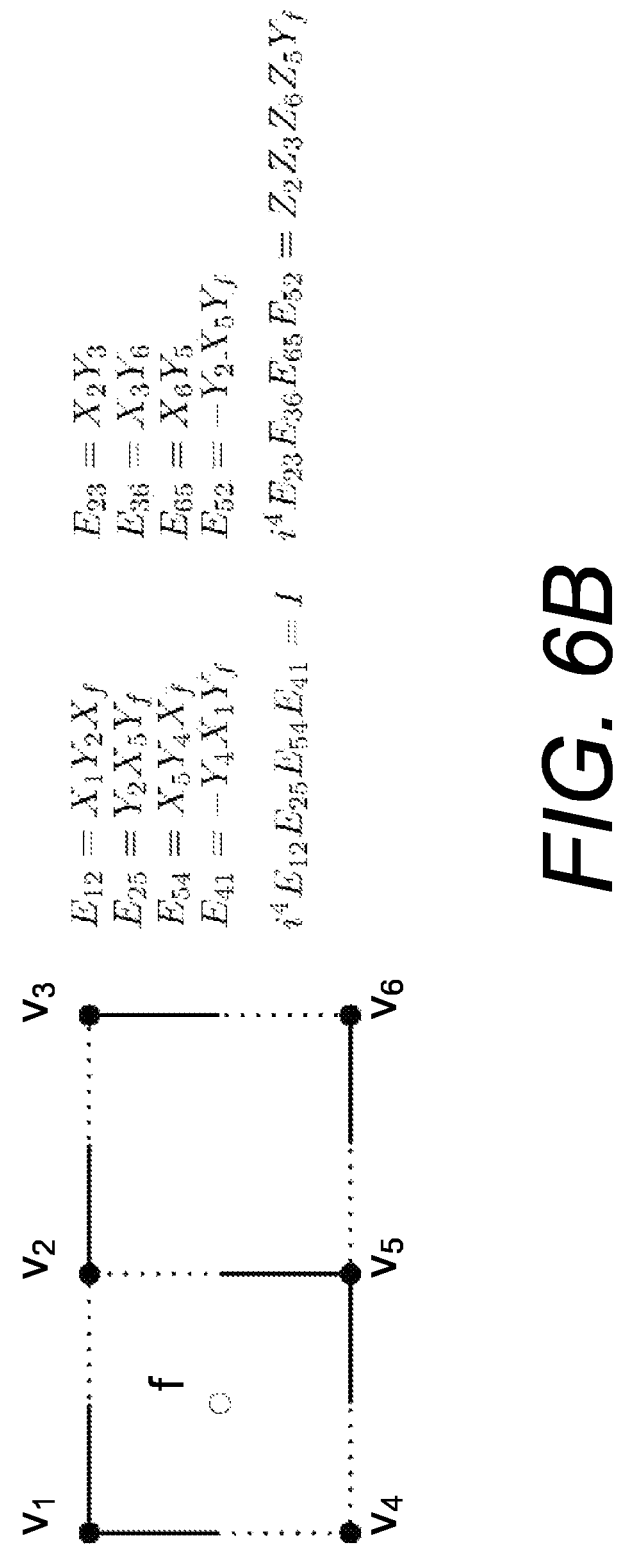
FIG. 6B illustrates shows edge operators for some edges of the encoding graph of FIG. 6A.

FIG. 6B shows the resulting edge operator definitions for a subgraph of the encoding graph of FIG. 6A and also shows the ordered product for two cycles within the subgraph.

Figure 7B:
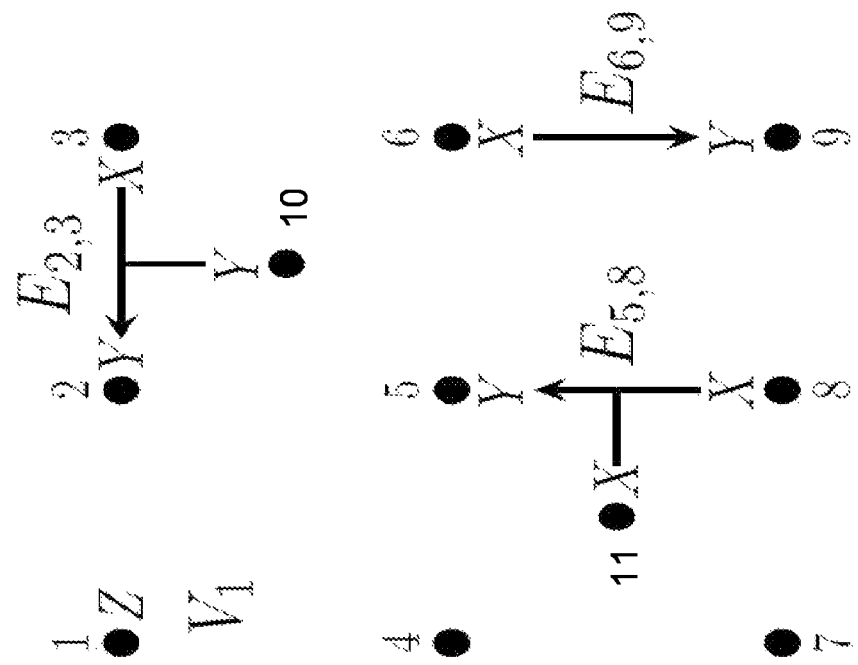
FIG. 7B illustrates edge operators as defined using the encoding graph of FIG. 7A.
Figure 7A:
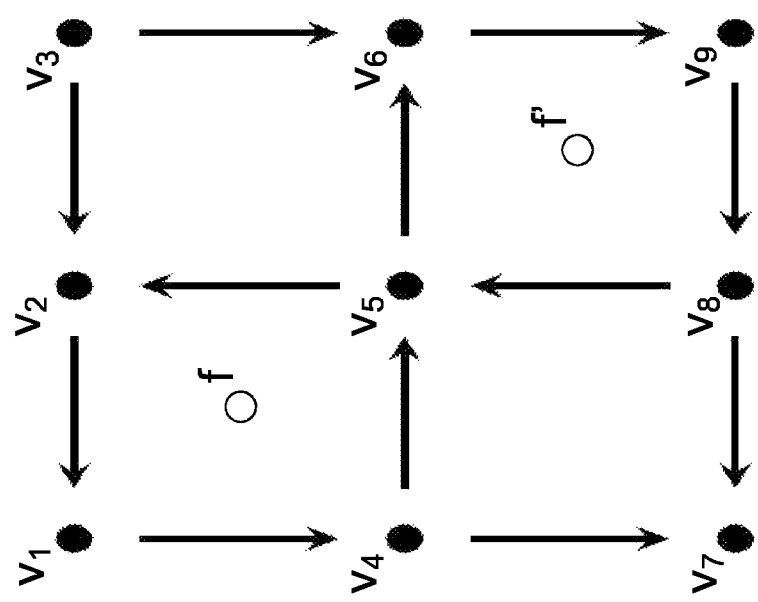
FIG. 7A illustrates a second encoding graph representable as a square lattice.

One may arrive at a similar square lattice encoding graph in another way, as illustrated in FIG. 7A and FIG. 7B (in which the face qubits f and f' are shown in different faces to those of FIG. 6A). One may label the faces of the lattice even and odd in a checker-board pattern. For the sake of clarity, assume to begin with that there are in total an even number of faces, and so an equal number of even and odd faces. Associate a face qubit to each of the odd faces, as illustrated in FIG. 7A. Give an orientation to the edges of the lattice so that they circulate around the even faces clockwise or counterclockwise, alternating on every row of faces. This is also illustrated in FIG. 7A, wherein arrows indicate the orientation of the corresponding edges. As can be seen, the arrows orient clockwise around the even face defined by vertices 5, 6, 9 and 8, while the arrows orient anticlockwise around the even face defined by vertices 1, 4, 5 and 2.

Let f (i, j) index the unique odd face adjacent to edge (i, j). For every directed edge (i, j), with i pointing to j, define the following encoded edge operators.

$$E_{ij} := \begin{cases} X_i Y_j X_{f(i,j)} & \text{if } (i, j) \text{ is a vertical down arrow} \\ -X_i Y_j X_{f(i,j)} & \text{if } (i, j) \text{ is a vertical up arrow} \\ X_i Y_j Y_{f(i,j)} & \text{if } (i, j) \text{ is horizontal} \end{cases} \quad (16)$$

$$E_{ji} := -E_{ij}. \quad (17)$$

The difference in sign for edges oriented vertically upwards and downwards ensures that closed loops around odd faces are equal to 1 and not −1. For those edges on the boundary which are not adjacent to an odd face, the operations on face qubits can be disregarded. For every vertex j define the encoded vertex operators $$V_j := Z_j \quad (18)$$

This specifies all encoded vertex and edge operators. This encoding is illustrated in FIG. 7B. As can be seen in FIG. 7B an edge operator acting on the edge (6, 9) comprises an X operation on the vertex qubit associated with vertex 6 and a Y operation on the vertex qubit associated with vertex 9. An edge operator acting on edge (8, 5) comprises an X operation on the vertex qubit associated with vertex 8, a Y operation on the vertex qubit associated with vertex 5, and a X operation on the face qubit f'.

It is not difficult to see that this encoding satisfies all of equations 9, 10 and 11. The intuition is that one may think of a directed edge as having an X on the tail and a Y on the head. whenever the head of one edge touches the tail of another, then those two edge operators anti-commute, while if two edges touch head to head or tail to tail, then they commute. By adding a face qubit at some faces, and choosing an appropriate orientation for the edges, one can enforce the additional necessary anti-commutation relations at the face qubits, as has been done here.

For M fermionic modes, this encodings characterised by an encoding graph such as in FIGS. 6A-7B uses less than 1.5M qubits. Such encodings result in Fermi-Hubbard terms with Pauli weight at most 3.

This encoding also demands that one restrict to a stabilizer code space, in order to satisfy Equation 12. The stabilizers $\tilde{S}_p$ are indexed by all of the closed loops p on the lattice, and are given by:

$$\tilde{S}_p = i^{|p-1|} \prod_{i=1}^{|p-1|} \tilde{E}_{p_i p_{i+1}} \qquad (19)$$

However some of these stabilizers are equal to 1. Take for instance the loop of edge operators going around vertices 4, 7, 8, 5 in FIG. 7B. The product of those edges is 1. This is true for every odd face. On the other hand the stabilizer loops around even faces are non-trivial, and are illustrated in FIG. 8B, with FIG. 8A illustrating the edge operators whose product produces the stabilizer. Therefore the number of independent stabilizer generators is half the number of faces, while the number of qubits is the number of fermionic modes plus half the number of faces. Thus the encoded Hilbert space is of the same dimension as the full fermionic Hilbert space $\mathfrak{H} = \mathfrak{H}_0 \oplus \mathfrak{H}_1$. This is another major departure from the superfast encoding of [BK02], which only encodes the even fermionic Hilbert space $\mathfrak{H}_0$. Accordingly, odd fermionic operators may also be translated into qubit operators, in contrast to many encodings such as that of [BK02] which may be used only with parity-preserving even fermionic operators. This in turn means that a greater variety of quantum operations may be performed.

Since the full fermionic Hilbert space is encoded, single fermions also admit a representation. It suffices to specify one majorana operator, and all other fermions may be constructed using edge and vertex operators, and linear combinations of majoranas. A logical majorana operator $\gamma_j$ must anti-commute with all edge operators associated with edges adjacent to site $v_j$ and the vertex operator Consider the corners of the lattice associated with an odd face. Such a corner j either has arrows pointing into it or pointing away from it. If the arrows point into the corner then the physical majorana operator $\tilde{\gamma}_j = X_j$, otherwise $\tilde{\gamma}_j = Y_j$. The choice of corner is arbitrary. In the case of an even number of faces, there are two possible choices of corners, and once a corner is chosen, then the equivalent operator at the other corner corresponds to a majorana hole operator $h_i := \gamma_i \Pi_j V_j$.

Odd Number of Faces

Figure 10B:
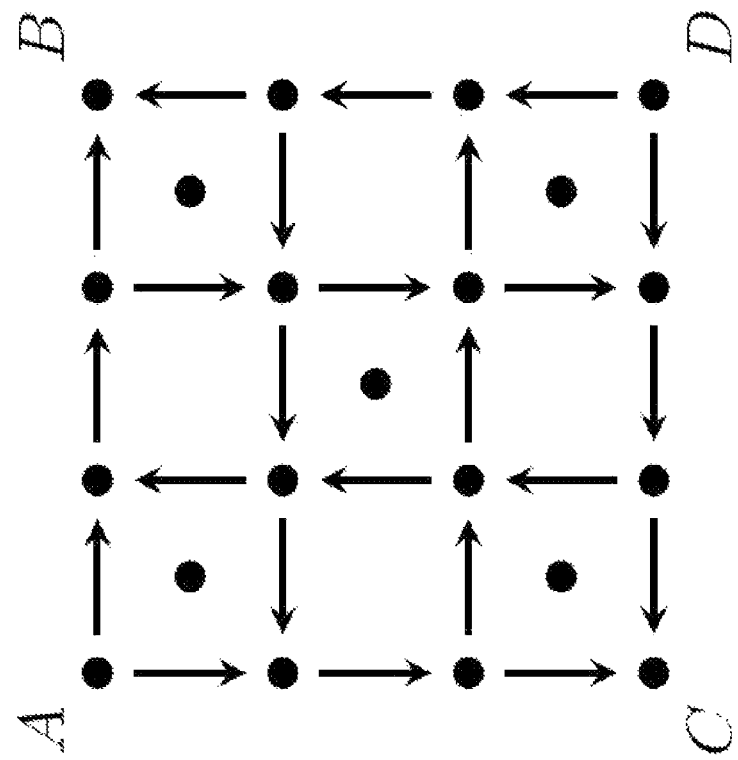
FIG. 10A and FIG. 10B illustrate two possible choices of encoding for a square lattice having an odd number of faces.
Figure 10A:
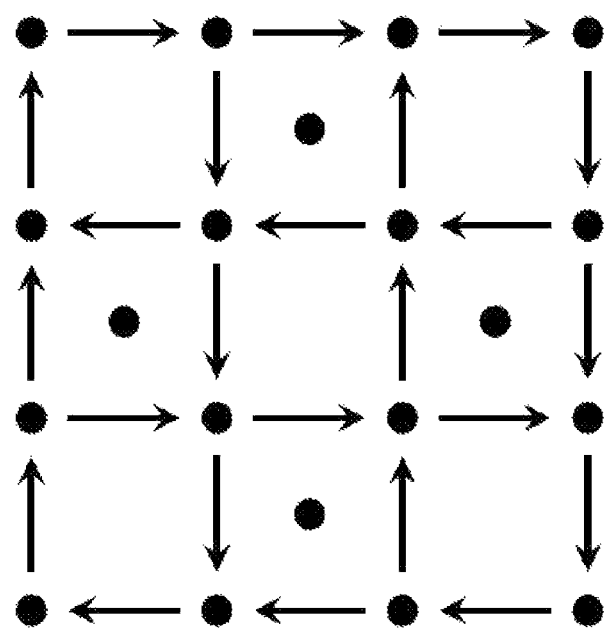

If an encoding graph is representable as a square lattice having an odd number of faces, then there are two possible checker-board patterns. In one case (case (a)) there is an extra even face and every corner is even. This is illustrated in FIG. 9A in terms of incidence labellings and is illustrated in FIG. 10A in terms of directed edges. In the other case (case (b)), illustrated in FIG. 9B in terms of incidence labellings and in FIG. 10B in terms of directed edges, there is an extra odd face and every corner is odd. One may proceed with constructing the encoding as prescribed above for the even number of faces.

In case (a) there is one more stabilizer than face qubit. Furthermore, it is not difficult to see that, up to stabilizers, $\Pi_j V_j = 1$, and so in this case the code space is restricted to the even fermion subspace. This is further evidenced by the fact that, unlike for lattices with an even number of faces where a majorana can be "injected" into an odd corner, here there are no odd corners in which to inject majoranas, and so single fermion operators do not admit a representation in this code.

In case (b), there is one more face qubit than stabilizer, and so the encoded space is the full fermionic space plus one qubit degree of freedom $\mathbb{C}^2 \otimes \mathbb{F}$. Furthermore there are four species of majorana $A_i$, $B_i$, $C_i$ and $D_i$, which may be injected at each of the four corners A, B, C, and D (see FIG. 10B) and then translated by edge operators to site $v_j$. These majorana operators satisfy the following commutation and anti-commutation relations:

$$[M_i, M_j]_+ = 0 \,\forall M \in \{A, B, C, D\} \qquad (20)$$

$$[M_i, M'_j] = 0 \,\forall M \neq M' \in \{A, B, C, D\} \qquad (21)$$

Furthermore these species of majorana fuse into non-trivial string defects:

$$A \times B \approx C \times D \approx \varepsilon_1 \qquad (22)$$

$$A \times C \approx B \times D \approx \varepsilon_2 \qquad (23)$$

$$A \times B \times C \times D \approx 1 \qquad (24)$$

where this equivalence is modulo stabilizers and logical edge and vertex operations.

One may privilege one corner (for example, choose A) as the majorana operator on the fermionic system and the identity on the qubit system. The remaining corners may then be identified as hole operators on the fermionic system coupled to a Pauli operator on the qubit system $$A_i = \mathbb{I} \otimes \gamma_i, \, B_i = Y \otimes h_i, \, C_i = X \otimes h_i, \, D_i = Z \otimes h_i \qquad (25)$$

recalling that $h_i = \gamma_i \Pi_j V_j$. It then immediately follows that the non-trivial string defects correspond to Pauli operators on the logical qubit system.

$$\varepsilon_1 \approx Y, \, \varepsilon_2 \approx X \qquad (26)$$

Figure 11B:
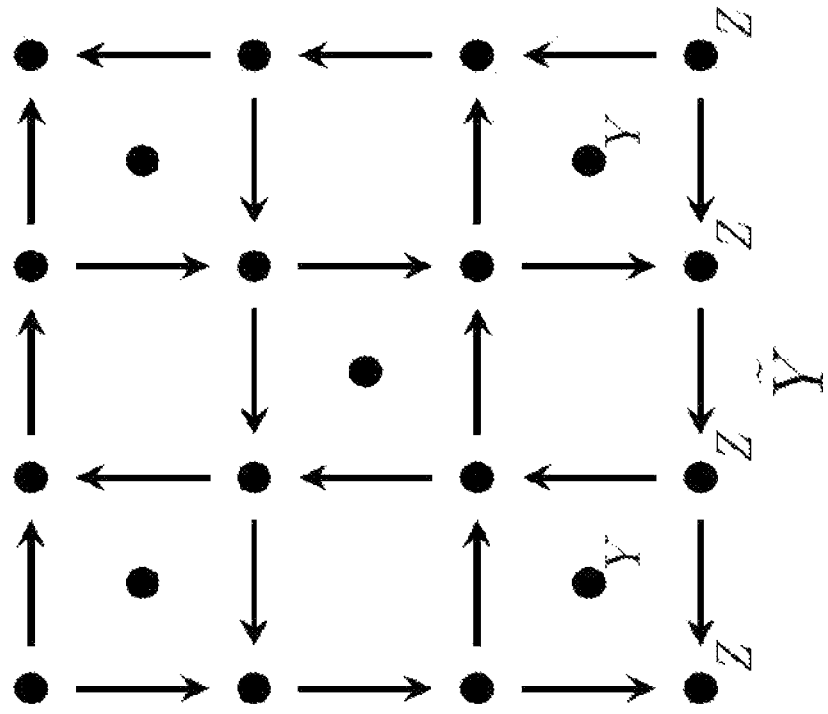
FIG. 11A and FIG. 11B illustrate logical X and Y encodings on the extra logical qubit in the case of FIG. 10B.
Figure 11A:
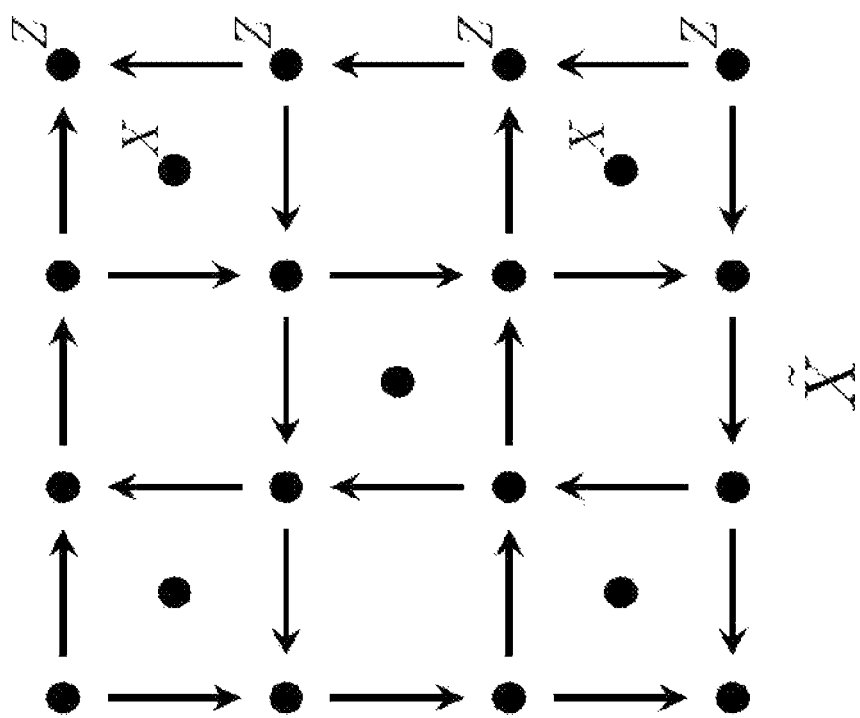

The physical Y and X operators are illustrated in FIG. 11A and FIG. 11B. They are strings of Zs along the bottom and right edge respectively, and strings of Ys along the bottom most row of faces and Xs along the right most column of faces respectively. Note that if one treats one of these operators as a stabilizer, then one restricts to the full fermionic code space without an extra logical qubit. In this case, as one should expect, there are only two corners in which to inject a majorana, since injecting a majorana at either of the other two corners would anti-commute with the chosen stabilizer. These two species are clearly the majorana and its hole counterpart.

Hexagonal Lattice Encoding

Figure 12A:
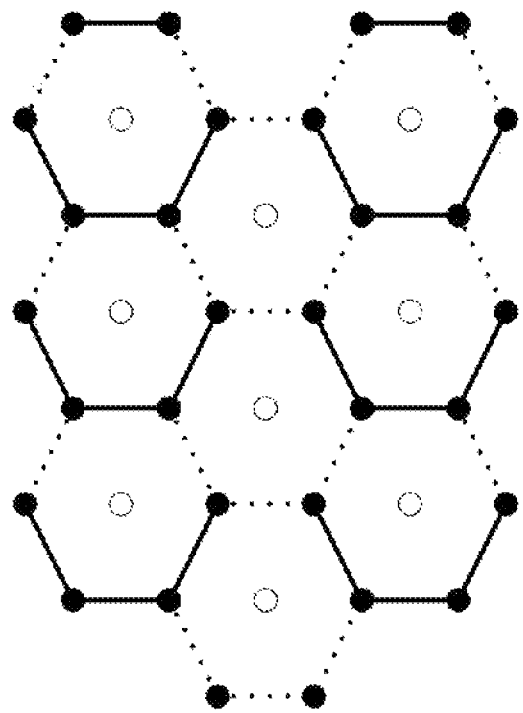
FIG. 12A illustrates an encoding graph representable as a hexagonal lattice.

FIG. 12A illustrates a planar encoding graph that is representable as a hexagonal lattice. In the particular example, shown in FIG. 12A, the encoding graph comprises thirty vertices and thirty eight edges. In the example shown, the encoding graph has nine faces.

Hexagonal lattices admit a similar construction to that outlined above. Again, each incidence is labelled with either a first label "X" or a second label "Y". An incidence frustration comprises a first incidence, $(e_{vp,vq}, v_p)$, and a second incidence, $(e_{vr,vp}, v_p)$, on a common vertex, $v_p$, for which the label of the first incidence is the same as the label of the second incidence. Accordingly, as can be seen in FIG. 12A, there are a large number of incidence frustrations.

Figure 12B:
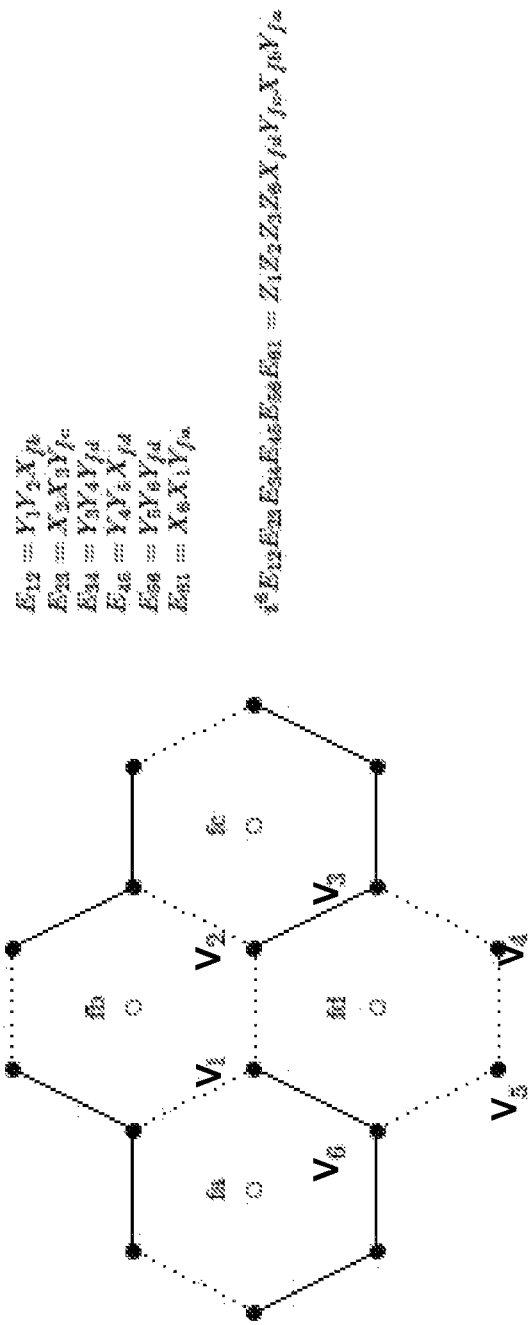
FIG. 12B shows edge operators for some edges of the encoding graph of FIG. 12A.

Each incidence frustration is associated with a face qubit. In FIG. 12A, each incidence frustration is associated with the face qubit in the face above the incidence. FIG. 12B shows a subgraph of an encoding graph which illustrates this more clearly and shows the defined edge operators for some of the edges.

Once again, vertex operators 17, are taken to be a Z operator for all vertices of the encoding graph, while each incidence labelled with the first label "X" is associated with a Pauli-X operator and each incidence labelled with the second label "Y" is associated with a Pauli-Y operator. However, the skilled person would appreciate that this need not be the case.

Once again, the stabilizers of this encoding are closed loops, however in this case there are no trivial loops, so there is a stabilizer generator for every face. This implies that the code space is the full fermionic space. One again, single fermion operators may be injected into the code at some of the vertices. Using this encoding for the Fermi-Hubbard model on a hexagonal lattice results in terms with Pauli weight at most 3. With M modes, this encoding uses fewer than 1.5M qubits.

Comparison of Fermion-to-Qubit Encodings

FIG. 13 shows a table illustrating the qubit number and a maximum Pauli weights when encoding the Fermi-Hubbard model using the fermion-to-qubit encodings described above. The row "Max Weight Hopping" details the maximum Pauli weight of the hopping term $a_i^\dagger a_j + a_j^\dagger a_i$ of the Fermi-Hubbard Hamiltonian, and the row "Max Weight Coulomb" indicates the maximum Pauli weight of the coulomb term $a_{i\uparrow}^\dagger a_{i\uparrow} a_{i\downarrow}^\dagger a_{i\downarrow}$ where the up and down arrows represent spin states. FIG. 14 shows a table illustrating the qubit number and maximum Pauli weights when encoding the Fermi-Hubbard model on an L×L grid ($2L^2$ modes) using other known fermion-to-qubit encodings.

Further Encoding Graphs

Figure 15B:
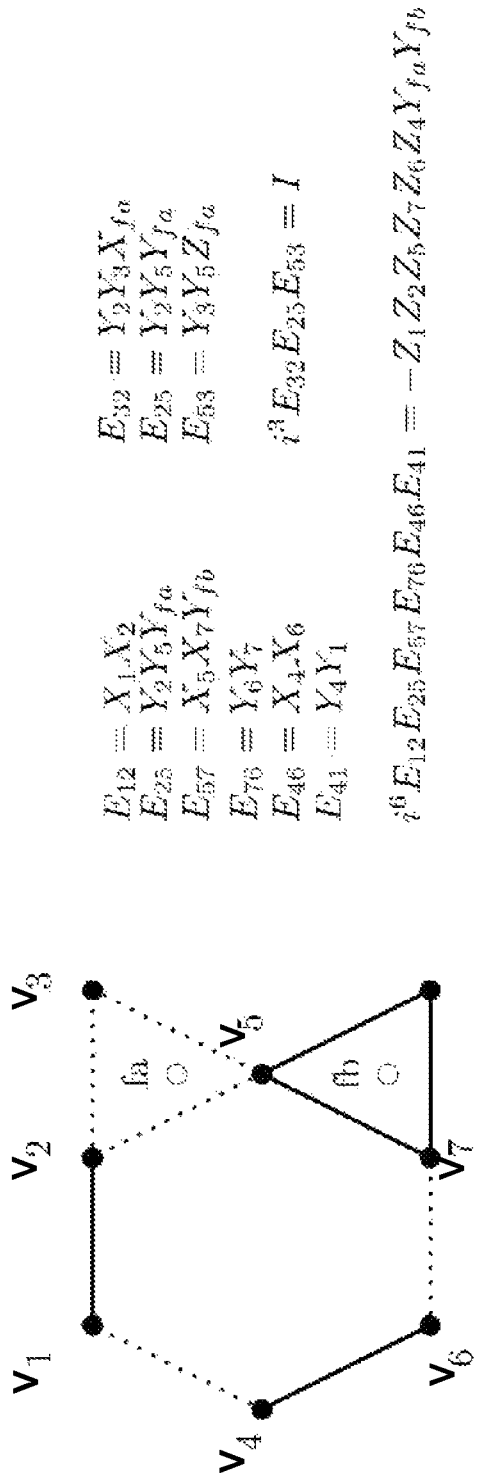
FIG. 15B illustrates edge operators as defined using the encoding graph of FIG. 15A.

FIG. 15A illustrates a planar encoding graph representable as a kagome lattice. For each triangular face of the kagome lattice, there are three incidence frustrations, and the three incidences are all associated with the same face qubit. FIG. 15B shows the corresponding definitions of some of the edge operators. Once again, vertex operators $V_s$ are taken to be a Z operator for all vertices of the encoding graph, while each incidence labelled with the first label "X" is associated with a Pauli-X operator and each incidence labelled with the second label "Y" is associated with a Pauli-Y operator. However, the skilled person would appreciate that this need not be the case.

FIG. 16 illustrates a planar encoding graph representable as a hybrid hexagonal-square lattice. Once again, fermionic operators can be translated to qubit operators by defining vertex operators and edge operators as explained above. Similarly, FIG. 17 illustrates a planar encoding graph representable as a 4.3.4.6 uniform tiling.

Figure 18A:
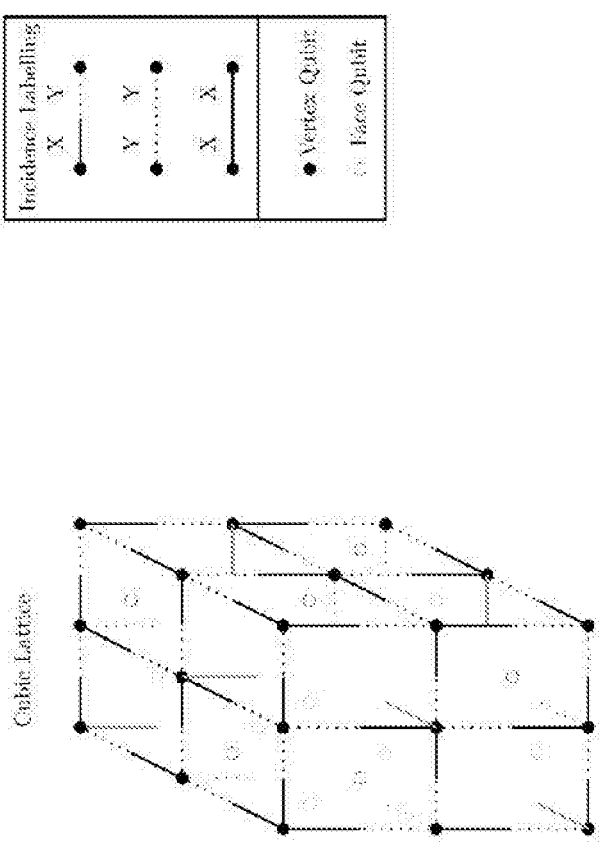
FIG. 18A illustrates a non-planar encoding graph representable as a cubic lattice.

While the examples described above have related to encoding graphs representable as a planar graph, a fermion-to-qubit encoding may be characterised by a non-planar encoding graph. In one example (see FIG. 18A and FIG. 18B), a non-planar encoding graph may be representable as a cubic lattice. Local fermionic modes may be associated with each of the vertices of the non-planar encoding graph. In any non-planar graph the notion of a face is not well-defined; a face qubit may be a qubit that is affected by the fermion-to-qubit encoding but that is not a vertex qubit; i.e. a qubit that is not associated with a vertex of the encoding graph. Nevertheless, for illustrative purposes only, face qubits are shown in FIG. 18A in the proximity of the incidence frustrations with which they are associated.

Figure 18B:
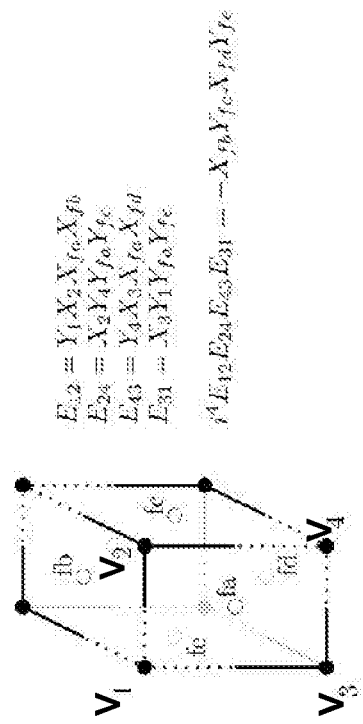
FIG. 18B illustrates edge operators as defined using the encoding graph of FIG. 18A.

FIG. 18B illustrates a subsection of the cubic lattice, and the definitions of various edge operators.

The skilled person would appreciate that encoding graphs may be characterised by other non-planar encoding graphs.

Figure 19:
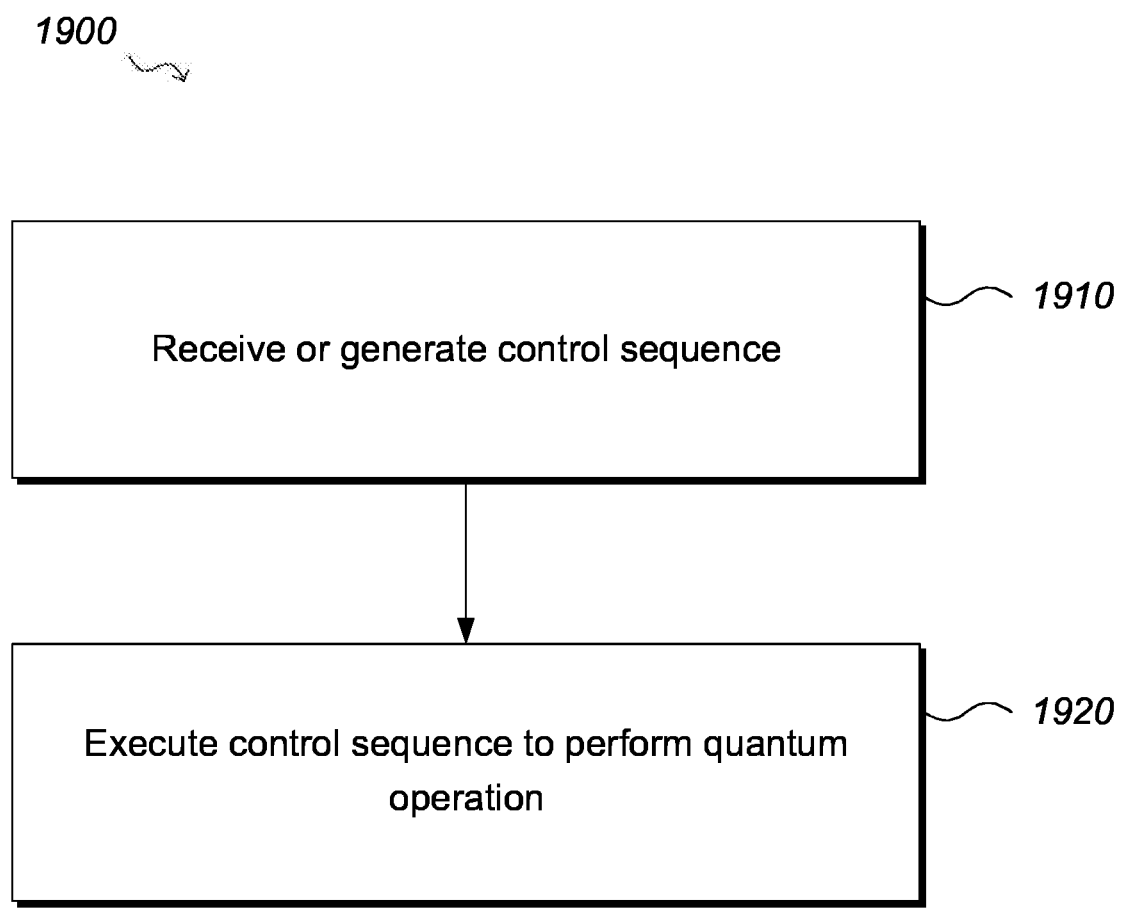
FIG. 19 shows a flowchart.

FIG. 19 shows a flowchart of a method for performing a quantum operation on a quantum information processor. The method may be performed, for example, by controller apparatus 130 of FIG. 1. At 1910, a control sequence is received or generated, the control sequence determined according to a method as described herein. For example, the controller apparatus 130 may receive the control sequence from a computing device 120, or may generate the control sequence itself. At 1920, the control sequence is executed in order to perform the quantum operation on the quantum information processor. For example, controller apparatus 130 may use interaction means 140 to apply control signals 330 to the qubits of the quantum information processor, and to read out a state of the quantum information processor.

Variations of the described embodiments are envisaged, for example, the features of all the disclosed embodiments may be combined in any way.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of determining a control sequence for performing a quantum operation on a quantum information processor comprising a plurality of vertex qubits and a plurality of face qubits, wherein the quantum operation is characterised by a fermionic quantum operator for acting on local fermionic modes, the method comprising:
   translating, using a fermion-to-qubit encoding, the fermionic quantum operator to a qubit operator for operating on the plurality of vertex qubits and face qubits;
   determining, from the qubit operator, the control sequence for performing the quantum operation on the quantum information processor,
   wherein, the fermion-to-qubit encoding is characterised by an encoding graph comprising a plurality of vertices and edges, wherein each edge, $e_{vj,vk}$, is incident on two vertices, ($v_j$, $v_k$), wherein each incidence, ($e_{vj,vk}$, $v_j$), in the encoding graph is labelled with either a first label or a second label, wherein each local fermionic mode on which the fermionic quantum operator acts is associated with a corresponding vertex of the encoding graph, wherein each vertex qubit of the plurality of vertex qubits is associated with a corresponding vertex of the encoding graph, and wherein each incidence frustration is associated with a face qubit of the plurality of face qubits, wherein an incidence frustration comprises a first incidence, ($e_{vp,vq}$, $v_p$), and a second incidence, ($e_{vr,vp}$, $v_p$), on a common vertex, $v_p$, for which the label of the first incidence is the same as the label of the second incidence,
   wherein the qubit operator is associated with a combination of at least one vertex operator and/or at least one edge operator, wherein, for a vertex, $v_s$, of the encoding graph, a corresponding vertex operator, $V_s$, consists of a single-qubit Pauli operator acting on the vertex qubit, s, associated with that vertex, wherein an edge operator, $E_{mn}$, is associated with an ordered pair of adjacent vertices, $(v_m, v_n)$, and a corresponding pair of incidences, $(e_{vm,vn}, v_m)$, $(e_{vm,vn}, v_n)$, and comprises:

for each vertex $v_m$ of the ordered pair of adjacent vertices:
   a first-type single-qubit Pauli operator, $\sigma_m^1$, acting on the vertex qubit, m, associated with the vertex $v_m$, if the corresponding incidence $(e_{vm,vn}, v_m)$ is labelled with the first label, the first-type single-qubit Pauli operator different from the vertex operator, $V_m$, for that vertex;
   a second-type single-qubit Pauli operator, $\sigma_m^2$, acting on the vertex qubit, m, associated with the vertex $v_m$ if the corresponding incidence $(e_{vm,vn}, v_m)$ is labelled with the second label, the second-type single-qubit Pauli operator different from the first-type single-qubit Pauli operator and the vertex operator, $V_m$, for that vertex, $v_m$, and wherein the edge operator, $E_{mn}$, further comprises:
   a single-qubit Pauli operator, $\sigma(e_{vm,vn}, f)$, acting on every face qubit f associated with an incidence frustration if that incidence frustration comprises an incidence to which the edge, $e_{vm,vn}$, belongs, wherein the edge operators satisfy the condition $E_{mn} = -E_{nm}$, wherein a first single-qubit Pauli operator $\sigma(e_{vm,vn}, f)$ of a first edge operator $E_{mn}$ and a second single-qubit Pauli operator $\sigma(e_{vm,vk}, f)$ of a second edge operator $E_{mk}$ acting on a common face qubit f are different if an incidence, $(e_{vm,vn}, v_m)$, associated with the first edge operator, $E_{mn}$, and an incidence, $(e_{vm,vk}, v_m)$, associated with the second edge operator, $E_{mk}$, are comprised within the same incidence frustration, and are the same if the incidence, $(e_{vm,vn}, v_m)$, associated with the first edge operator, $E_{mn}$, and the incidence, $(e_{vm,vk}, v_m)$, associated with the second edge operator, $E_{mk}$, are not comprised withing the same incidence frustration, and wherein for every cycle of the encoding graph characterised by an ordered sequence of adjacent vertices $(v_1, v_2, \ldots, v_N)$ where $v_N = v_1$, the ordered product of associated edge operators $(i^{N-1})\prod_{t=1}^{N-1} E_{t,t+1}$ is either a single/multi-qubit Pauli operator or an identity operator, and communicating, via a network, the control sequence to a controller that controls an interaction module to execute the control sequence on the quantum information processor.

2. A computer-implemented method according to claim 1, wherein each face qubit is associated with multiple incidence frustrations.

3. A computer-implemented method according to claim 1, wherein each edge operator acts on at most three qubits.

4. A computer-implemented method according to claim 1, wherein the encoding graph is a planar graph.

5. A computer-implemented method according to claim 4, wherein the encoding graph is representable as a rectangular lattice.

6. A computer-implemented method according to claim 5 wherein the encoding graph comprises odd faces and even faces, wherein an odd face is a face for which every pair of bounding edges incident on a common vertex give rise to an incidence frustration, wherein an even face is a face for which no pair of bounding edges give rise to an incidence frustration, and wherein the faces of the rectangular lattice are alternately odd or even faces.

7. A computer-implemented method according to claim 6, wherein all incidence frustrations bounding an odd face are associated with the same face qubit.

8. A computer-implemented method according to claim 7, wherein the total number of faces in the encoding graph is even.

9. A computer-implemented method according to claim 7, wherein the total number of faces in the encoding graph is odd.

10. A computer-implemented method according to claim 9 wherein the total number of odd faces is greater than the total number of even faces.

11. A computer-implemented method according to claim 4, wherein the encoding graph is representable as a hexagonal lattice.

12. A computer-implemented method according to claim 4, wherein the encoding graph is representable as a kagome lattice.

13. A computer-implementable method according to claim 4 wherein the encoding graph is representable as a hybrid hexagonal-square lattice.

14. A computer-implemented method according to claim 1, wherein the encoding graph is a non-planar graph.

15. A computer-implemented method according to claim 14, wherein the encoding graph is representable as a cubic lattice.

16. A computer-implemented method according to claim 1, wherein the fermionic quantum operator comprises an even fermionic operator.

17. A computer-implemented method according to claim 1, wherein the even fermionic quantum operator comprises a fermionic Hamiltonian operator.

18. A computer-implemented method according to claim 1, wherein the fermionic quantum operator comprises an odd fermionic operator and wherein the qubit operator is expressible as a combination of a Majorana operator and at least one vertex operator and/or at least one edge operator.

19. A non-transitory computer-readable medium having instructions stored thereon which, when executed by one or more processors, cause the one or more processors to execute a method of determining a control sequence for performing a quantum operation on a quantum information processor comprising a plurality of vertex qubits and a plurality of face qubits, wherein the quantum operation is characterised by a fermionic quantum operator for acting on local fermionic modes, the method comprising:

translating, using a fermion-to-qubit encoding, the fermionic quantum operator to a qubit operator for operating on the plurality of vertex qubits and face qubits;

determining, from the qubit operator, the control sequence for performing the quantum operation on the quantum information processor, wherein, the fermion-to-qubit encoding is characterised by an encoding graph comprising a plurality of vertices and edges, wherein each edge, $e_{vj,vk}$, is incident on two vertices, $(v_j, v_k)$, wherein each incidence, $(e_{vj,vk}, v_j)$, in the encoding graph is labelled with either a first label or a second label, wherein each local fermionic mode on which the fermionic quantum operator acts is associated with a corresponding vertex of the encoding graph, wherein each vertex qubit of the plurality of vertex qubits is associated with a corresponding vertex of the encoding graph, and wherein each incidence frustration is associated with a face qubit of the plurality of face qubits, wherein an incidence frustration comprises a first incidence, $(e_{vp,vq}, v_p)$, and a second incidence, $(e_{vr,vp}, v_p)$, on a common vertex, $v_p$, for which the label of the first incidence is the same as the label of the second incidence, wherein the qubit operator is associated with a combination of at least one vertex operator and/or at least one edge operator, wherein, for a vertex, $v_s$, of the encoding graph, a corresponding vertex operator, $V_s$, consists of a single-qubit Pauli operator acting on the vertex qubit, s, associated with that vertex, wherein an edge operator, $E_{mn}$, is associated with an ordered pair of adjacent vertices, $(v_m, v_n)$, and a corresponding pair of incidences, $(e_{vm,vn}, v_m)$, $(e_{vm,vn}, v_n)$, and comprises:

for each vertex $v_m$ of the ordered pair of adjacent vertices:
  a first-type single-qubit Pauli operator, $\sigma_m^1$, acting on the vertex qubit, m, associated with the vertex $v_m$ if the corresponding incidence $(e_{vm,vn}, v_m)$ is labelled with the first label, the first-type single-qubit Pauli operator different from the vertex operator, $V_m$, for that vertex;
  a second-type single-qubit Pauli operator, $\sigma_m^2$, acting on the vertex qubit, m, associated with the vertex $v_m$ if the corresponding incidence $(e_{vm,vn}, v_m)$ is labelled with the second label, the second-type single-qubit Pauli operator different from the first-type single-qubit Pauli operator and the vertex operator, $V_m$, for that vertex, $v_m$, and wherein the edge operator, $E_{nm}$ further comprises:
  a single-qubit Pauli operator, $\sigma(e_{vm,vn}, f)$, acting on every face qubit f associated with an incidence frustration if that incidence frustration comprises an incidence to which the edge, $e_{vm,vn}$, belongs, wherein the edge operators satisfy the condition $E_{nm} = -E_{nm}$, wherein a first single-qubit Pauli operator $\sigma(e_{vm,vn}, f)$ of a first edge operator $E_{mn}$ and a second single-qubit Pauli operator $\sigma(e_{vm,vk}, f)$ of a second edge operator $E_{mk}$ acting on a common face qubit f are different if an incidence, $(e_{vm,vn}, v_m)$, associated with the first edge operator, $E_{mn}$, and an incidence, $(e_{vm,vn}, v_m)$, associated with the second edge operator, $E_{mk}$, are comprised within the same incidence frustration, and are the same if the incidence, $(e_{vm,vn}, v_m)$, associated with the first edge operator, $E_{mn}$, and the incidence, $(e_{vm,vn}, v_m)$, associated with the second edge operator, $E_{mk}$, are not comprised withing the same incidence frustration, and wherein for every cycle of the encoding graph characterised by an ordered sequence of adjacent vertices $(v_1, v_2, \ldots, v_N)$ where $v_N = v_1$, the ordered product of associated edge operators $(i^{N-1})\Pi_{t=1}^{N-1} E_{t,t+1}$ is either a single/multi-qubit Pauli operator or an identity operator, and communicating, via a network, the control sequence to a controller that controls an interaction module to execute the control sequence on the quantum information processor.

20. A computing device comprising one or more processors configured to execute a method of determining a control sequence for performing a quantum operation on a quantum information processor comprising a plurality of vertex qubits and a plurality of face qubits, wherein the quantum operation is characterised by a fermionic quantum operator for acting on local fermionic modes, the method comprising:

translating, using a fermion-to-qubit encoding, the fermionic quantum operator to a qubit operator for operating on the plurality of vertex qubits and face qubits;

determining, from the qubit operator, the control sequence for performing the quantum operation on the quantum information processor, wherein, the fermion-to-qubit encoding is characterised by an encoding graph comprising a plurality of vertices and edges, wherein each edge, $e_{vj,vk}$, is incident on two vertices, $(v_j, v_k)$, wherein each incidence, $(e_{vj,vk}, v_j)$, in the encoding graph is labelled with either a first label or a second label, wherein each local fermionic mode on which the fermionic quantum operator acts is associated with a corresponding vertex of the encoding graph, wherein each vertex qubit of the plurality of vertex qubits is associated with a corresponding vertex of the encoding graph, and wherein each incidence frustration is associated with a face qubit of the plurality of face qubits, wherein an incidence frustration comprises a first incidence, $(e_{vp,vq}, v_p)$, and a second incidence, $(e_{vp,vq}, v_p)$, on a common vertex, $v_p$, for which the label of the first incidence is the same as the label of the second incidence, wherein the qubit operator is associated with a combination of at least one vertex operator and/or at least one edge operator, wherein, for a vertex, $v_s$, of the encoding graph, a corresponding vertex operator, $V_s$, consists of a single-qubit Pauli operator acting on the vertex qubit, s, associated with that vertex, wherein an edge operator, $E_{mn}$, is associated with an ordered pair of adjacent vertices, $(v_m, v_n)$, and a corresponding pair of incidences, $(e_{vm,vn}, v_m)$, $(e_{vm,vn}, v_n)$, and comprises:

for each vertex $v_m$ of the ordered pair of adjacent vertices:
  a first-type single-qubit Pauli operator, $\sigma_m^1$, acting on the vertex qubit, m, associated with the vertex $v_m$ if the corresponding incidence $(e_{vm,vn}, v_m)$ is labelled with the first label, the first-type single-qubit Pauli operator different from the vertex operator, $V_m$, for that vertex;
  a second-type single-qubit Pauli operator, $\sigma_m^2$, acting on the vertex qubit, m, associated with the vertex $v_m$ if the corresponding incidence $(e_{vm,vn}, v_m)$ is labelled with the second label, the second-type single-qubit Pauli operator different from the first-type single-qubit Pauli operator and the vertex operator, $V_m$, for that vertex, $v_m$, and wherein the edge operator, $E_{mn}$ further comprises:
  a single-qubit Pauli operator, $\sigma(e_{vm,vn}, f)$, acting on every face qubit f associated with an incidence frustration if that incidence frustration comprises an incidence to which the edge, $e_{vm,vn}$, belongs, wherein the edge operators satisfy the condition $E_{mn} = -E_{nm}$, wherein a first single-qubit Pauli operator $\sigma(e_{vm,vn}, f)$ of a first edge operator $E_{mn}$ and a second single-qubit Pauli operator $\sigma(e_{vm,vk}, f)$ of a second edge operator $E_{mk}$ acting on a common face qubit f are different if an incidence, $(e_{vm,vn}, v_m)$, associated with the first edge operator, $E_{mn}$, and an incidence, $(e_{vm,vk}, v_m)$, associated with the second edge operator, $E_{mk}$, are comprised within the same incidence frustration, and are the same if the incidence, $(e_{vm,vn}, v_m)$, associated with the first edge operator, $E_{mn}$, and the incidence, $(e_{vm,vk}, v_m)$, associated with the second edge operator, $E_{mk}$, are not comprised withing the same incidence frustration, and wherein for every cycle of the encoding graph characterised by an ordered sequence of adjacent vertices $(v_1, v_2, \ldots, v_N)$ where $v_N = v_1$, the ordered product of associated edge operators $(i^{N-1})\Pi_{t=1}^{N-1}E_{t,t+1}$ is either a single/multi-qubit Pauli operator or an identity operator, and communicating, via a network, the control sequence to a controller that controls an interaction module to execute the control sequence on the quantum information processor.

* * * * *